US012519963B2

(12) United States Patent
Xiu et al.

(10) Patent No.: US 12,519,963 B2
(45) Date of Patent: Jan. 6, 2026

(54) METHODS AND DEVICES FOR GEOMETRIC PARTITION MODE WITH MOTION VECTOR REFINEMENT

(71) Applicant: BEIJING DAJIA INTERNET INFORMATION TECHNOLOGY CO., LTD., Beijing (CN)

(72) Inventors: Xiaoyu Xiu, San Diego, CA (US); Wei Chen, San Diego, CA (US); Che-Wei Kuo, San Diego, CA (US); Hong-Jheng Zhu, San Diego, CA (US); Ning Yan, San Diego, CA (US); Yi-wen Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/540,756

(22) Filed: Dec. 14, 2023

(65) Prior Publication Data

US 2024/0146945 A1 May 2, 2024

Related U.S. Application Data

(63) Continuation of application No. PCT/US2022/033473, filed on Jun. 14, 2022.
(Continued)

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .... H04N 19/105; H04N 19/13; H04N 19/132; H04N 19/137; H04N 19/44; H04N 19/521; H04N 19/70; H04N 19/176
See application file for complete search history.

(56) References Cited

U.S. PATENT DOCUMENTS

| | | | |
|---|---|---|---|
| 11,070,820 B2 | 7/2021 | Zhang et al. | |
| 2016/0277762 A1* | 9/2016 | Zhang | H04N 19/593 |

(Continued)

FOREIGN PATENT DOCUMENTS

| | | |
|---|---|---|
| WO | 2020096426 A1 | 5/2020 |
| WO | 2020106189 A1 | 5/2020 |

(Continued)

OTHER PUBLICATIONS

"Geometric Partitioning Merge Mode with Motion Vector Refinement"—Panusopone et al.; 2020 IEEE 22nd International Workshop on Multimedia Signal Processing (MMSP) (Year: 2020).*
(Continued)

*Primary Examiner* — Mainul Hasan
(74) *Attorney, Agent, or Firm* — Arch & Lake LLP

(57) ABSTRACT

Provided is a method for video decoding including: receiving a control variable enabling adaptive switch between motion vector refinement (MVR) offset sets; receiving an indication variable enabling adaptive switch between codeword tables that binarize offset magnitudes in the MVR offset sets under the coding level; partitioning the video block into a first and a second geometric partition; selecting an MVR offset set based on the control variable; receiving syntax elements to determine a first and second MVR offsets
(Continued)

applied to the first and second geometric partitions from the selected MVR offset set; obtaining a first and second MVs from a candidate list for the first and the second geometric partition; calculating a first and second refined MVs based on the first and second MVs and the first and second MVR offsets; and obtaining prediction samples based on the first and second refined MVs.

17 Claims, 7 Drawing Sheets

Related U.S. Application Data

(60) Provisional application No. 63/210,484, filed on Jun. 14, 2021.

(51) Int. Cl.
*H04N 19/132* (2014.01)
*H04N 19/137* (2014.01)
*H04N 19/176* (2014.01)
*H04N 19/70* (2014.01)

(52) U.S. Cl.
CPC ......... *H04N 19/137* (2014.11); *H04N 19/176* (2014.11); *H04N 19/70* (2014.11)

(56) References Cited

U.S. PATENT DOCUMENTS

| | | | | |
|---|---|---|---|---|
| 2021/0006790 | A1* | 1/2021 | Zhang | H04N 19/52 |
| 2022/0329824 | A1* | 10/2022 | Liao | H04N 19/176 |
| 2023/0144567 | A1* | 5/2023 | Panusopone | H04N 19/119 |
| | | | | 375/240.02 |
| 2023/0283786 | A1* | 9/2023 | Zhang | H04N 19/521 |
| | | | | 375/240.02 |
| 2023/0421773 | A1* | 12/2023 | Chen | H04N 19/42 |
| 2024/0205414 | A1* | 6/2024 | Deng | H04N 19/109 |

FOREIGN PATENT DOCUMENTS

| | | |
|---|---|---|
| WO | 2020139059 A1 | 7/2020 |
| WO | 2020143774 A1 | 7/2020 |
| WO | 2020094049 A1 | 4/2023 |

OTHER PUBLICATIONS

"Geometric Partitioning Mode in Versatile Video Coding: Algorithm Review and Analysis"—Gao et al.; IEEE Transactions on Circuits and Systems for Video Technology, vol. 31, No. 9, Sep. 2021 (Year: 2021).*

"Decoder-Side Motion Vector Refinement in VVC: Algorithm and Hardware Implementation Considerations"—Gao et al.; IEEE Transactions on Circuits and Systems for Video Technology, vol. 31, No. 8, Aug. 2021 (Year: 2021).*

International Search Report of PCT Application No. PCT/US2022/033473 dated Sep. 27, 2022, (3p).

Xiaoyu Xiu et al., "AHG12: Evaluation of GPM with MMVD for coding efficiency improvement over VVC", Joint Video Experts Team (JVET) of ITU-T SG 16 WP 3 and ISO/IEC JTC 1/SC 29 22nd Meeting, by teleconference, Apr. 20-28, 2021, Document: JVET-V0125_r1, (5p).

Krit Panusopone et al., "Geometric Partitioning Merge Mode with Motion Vector Refinement", 2020 IEEE 22nd International Workshop on Multimedia Signal Processing (MMSP), Sep. 21-24, 2020, INSPEC Accession No. 20278371 DOI: 10.1109/MMSP48831.2020.9287109, (7p).

Jens-Rainer Ohm et al., "Algorithm description for Versatile Video Coding and Test Model 1 Associated Resources (VTM 11)", Joint Video Experts Team (JVET) Document: JVET-T2002-v2 of ITU-T SG 16 WP 3 and ISO/IEC JTC 1/SC 29, 20th Meeting, by teleconference, Oct. 7-16, 2020, (102p).

First Office Action of Japanese Application No. 2023-577272 dated Feb. 12, 2025, (8p).

Second Office Action of Japanese Application No. 2023-577272 dated Jul. 8, 2025, (5p).

Extended European Search Report of EP Application No. 22825690.5 dated Jul. 21, 2025, (12p).

Zhang (Bytedance) K et al: "Geometric prediction mode with motion vector differences", 130. MPEG Meeting; Apr. 20, 2020-Apr. 24, 2020; Alpbach; (Motion Picture Expert Group or ISO/IEC JTC1/SC29/WG11), No. m53431 ; JVET-R0357 Apr. 9, 2020 (Apr. 9, 2020), XP030286940, Retrieved from the Internet: URL:http://phenix.int-evry.fr/mpeg/doc_end_user/documents/130_Alpbach/wg11/m53431-JVET-R0357-v1-JVET-R0357.zip JVET-R0357.docx [retrieved on Apr. 9, 2020].

Deng (Bytedance) Z et al: "AHG12: Geometric prediction mode with motion vector differences", 22. JVET Meeting; Apr. 20, 2021-Apr. 28, 2021; Teleconference; (The Joint Video Exploration Team of ISO/IEC JTC1/SC29/WG11 and ITU-T SG. 16 ), No. JVET-V0103 ; m56515 Apr. 23, 2021 (Apr. 23, 2021), XP030294246, Retrieved from the Internet: URL:https://jvet-experts.org/doc_end_user/documents/22_Teleconference/wg11/JVET-V0103-v3.zip JVET-V0103_r2.docx [retrieved on Apr. 23, 2021].

Notice of Grant of Japanese counterpart Application No. 2023-577272 dated Nov. 11, 2025 with English translation, (6p).

Deng, Zhipin et al., "EE2-3.3: Gpm with Mmvd (JVET-V0103 and JVET-V025)" Joint Video Experts Team (JVET) of ITU-T SG 16 WP 3 and ISO/IEC JTC 1/SC 29, JVET-W0088-v2, 23rd Meeting by teleconference Jul. 7-16, 2021, (3p).

\* cited by examiner

METHODS AND DEVICES FOR GEOMETRIC PARTITION MODE WITH MOTION VECTOR REFINEMENT

CROSS-REFERENCE TO RELATED APPLICATION

This application a continuation application of International Application No. PCT/US2022/033473, filed on Jun. 14, 2022, which claims priority to Provisional Application No. 63/210,484 filed on Jun. 14, 2021, the disclosures of which are incorporated herein by reference in their entirety for all purposes.

TECHNICAL FIELD

This disclosure is related to video coding and compression. More specifically, this disclosure relates to methods and apparatus on improving the coding efficiency of geometric partition mode (GPM), also known as angular weighted prediction (AWP) mode.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

SUMMARY

The present disclosure provides methods and apparatus, for video coding and a non-transitory computer-readable storage medium.

According to a first aspect of the present disclosure, a method for decoding a video block in GPM is provided. The method may include receiving a control variable associated with the video block, where the control variable may enable adaptive switch between a plurality of motion vector refinement (MVR) offset sets and the control variable is applied at a coding level. The method may include receiving an indication variable associated with the video block, where the indication variable may enable adaptive switch between a plurality of codeword tables that binarize a plurality of offset magnitudes in the plurality of MVR offset sets under the coding level. The method may include partitioning the video block into a first geometric partition and a second geometric partition. The method may include selecting an MVR offset set from the plurality of MVR offset sets based on the control variable. The method may include receiving one or more syntax elements to determine a first MVR offset and a second MVR offset that are applied to the first and second geometric partitions from a selected MVR offset set. The method may include obtaining a first motion vector (MV) and a second MV from a candidate list for the first geometric partition and the second geometric partition. The method may include calculating a first refined MV and a second refined MV based on the first and second MVs and the first and second MVR offsets. Furthermore, the method may include obtaining prediction samples for the video block based on the first and second refined MVs.

According to a second aspect of the present disclosure, an apparatus for video decoding is provided. The apparatus may include one or more processors and a non-transitory computer-readable storage medium. The non-transitory computer-readable storage medium is configured to store instructions executable by the one or more processors. The one or more processors, upon execution of the instructions, are configured to perform the method in the first aspect.

According to a third aspect of the present disclosure, a non-transitory computer-readable storage medium is provided. The non-transitory computer-readable storage medium may store computer-executable instructions that, when executed by one or more computer processors, cause the one or more computer processors to perform the method in the first aspect.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 is a table illustrating a uni-prediction motion vector selection according to an example of the present disclosure.

DETAILED DESCRIPTION

Figure 1:
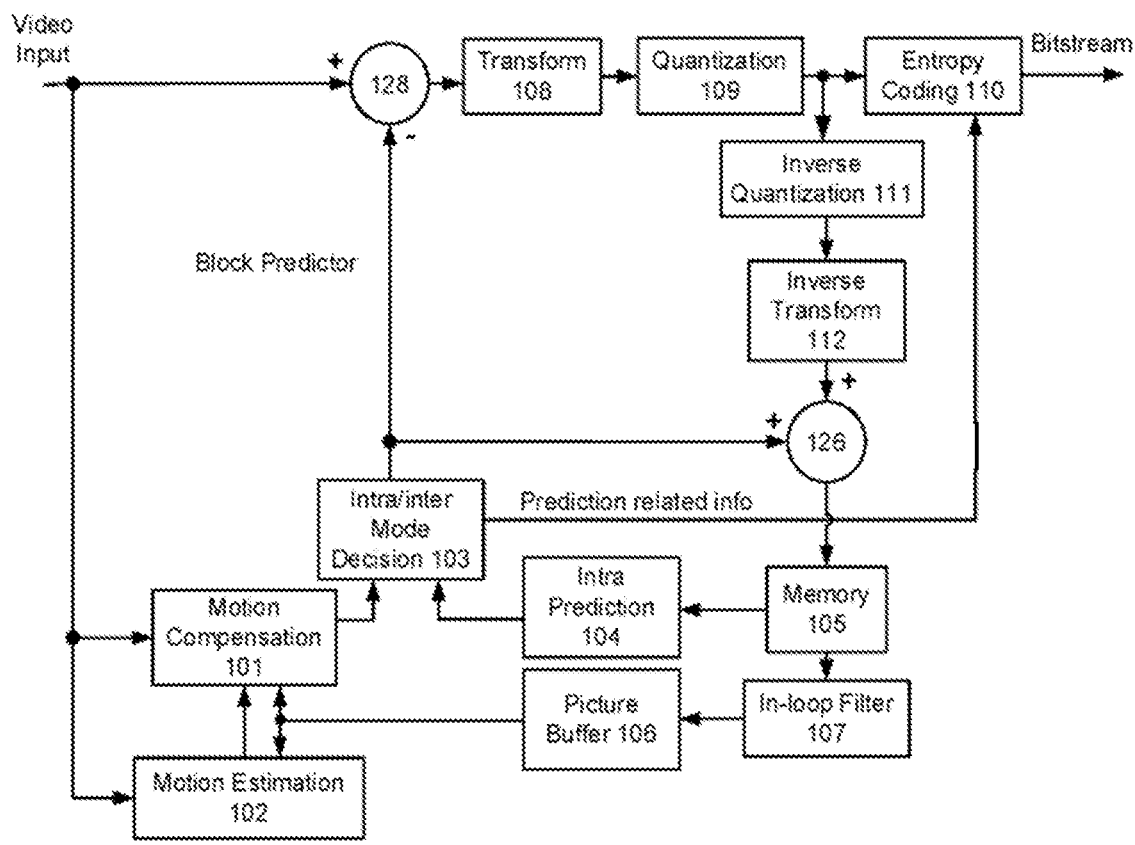
FIG. 1 is a block diagram of an encoder according to an example of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

Like the HEVC, the AVS3 standard is built upon the block-based hybrid video coding framework.

Figure 10:
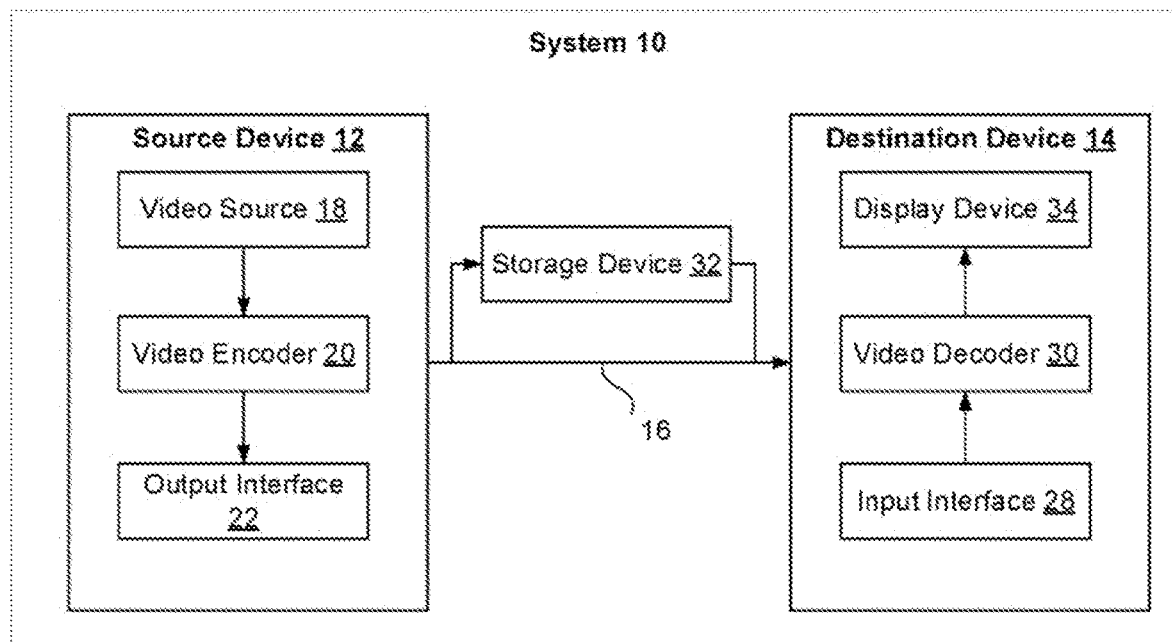
FIG. 10 is a block diagram illustrating a system for encoding and decoding video blocks in accordance with some examples of the present disclosure.

FIG. 10 is a block diagram illustrating an exemplary system 10 for encoding and decoding video blocks in parallel in accordance with some implementations of the present disclosure. As shown in FIG. 10, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi- Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 10, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

FIG. 1 shows a general diagram of a block-based video encoder for the VVC. Specifically, FIG. 1 shows a typical encoder. The encoder may be the video encoder 20 as shown in FIG. 10. The encoder has video input, motion compensation 101, motion estimation 102, intra/inter mode decision 103, block predictor, adder 128, transform 108, quantization 109, prediction related info, intra prediction 104, picture buffer 106, inverse quantization 111, inverse transform 112, adder 126, memory 105, in-loop filter 107, entropy coding 110, and bitstream.

In the encoder, a video frame is partitioned into a plurality of video blocks for processing. For each given video block, a prediction is formed based on either an inter prediction approach or an intra prediction approach. It should be noted that the term "frame" may be used as synonyms for the term "image" or "picture" in the field of video coding.

A prediction residual, representing the difference between a current video block, part of video input, and its predictor, part of block predictor, is sent to a transform 108 from adder 128. Transform coefficients are then sent from the Transform 108 to a Quantization 109 for entropy reduction. Quantized coefficients are then fed to an Entropy Coding 110 to generate a compressed video bitstream. As shown in FIG. 1, prediction related information from an intra/inter mode decision 103, such as video block partition info, motion vectors (MVs), reference picture index, and intra prediction mode, are also fed through the Entropy Coding 110 and saved into a compressed bitstream. Compressed bitstream includes a video bitstream.

In the encoder, decoder-related circuitries are also needed in order to reconstruct pixels for the purpose of prediction. First, a prediction residual is reconstructed through an Inverse Quantization 111 and an Inverse Transform 112. This reconstructed prediction residual is combined with a Block Predictor to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture store the temporal prediction signal comes from.

Motion estimation 102 intakes video input and a signal from picture buffer 106 and output, to motion compensation 101, a motion estimation signal. Motion compensation 101 intakes video input, a signal from picture buffer 106, and motion estimation signal from motion estimation 102 and output to intra/inter mode decision 103, a motion compensation signal.

After spatial and/or temporal prediction is performed, an intra/inter mode decision 103 in the encoder chooses the best prediction mode, for example, based on the rate-distortion optimization method. The block predictor is then subtracted from the current video block, and the resulting prediction residual is de-correlated using the transform 108 and the quantization 109. The resulting quantized residual coefficients are inverse quantized by the inverse quantization 111 and inverse transformed by the inverse transform 112 to form the reconstructed residual, which is then added back to the prediction block to form the reconstructed signal of the CU. Further in-loop filtering 107, such as a deblocking filter, a sample adaptive offset (SAO), and/or an adaptive in-loop filter (ALF) may be applied on the reconstructed CU before it is put in the reference picture store of the picture buffer 106 and used to code future video blocks. To form the output video bitstream, coding mode (inter or intra), prediction mode information, motion information, and quantized residual coefficients are all sent to the entropy coding unit 110 to be further compressed and packed to form the bitstream.

FIG. 1 gives the block diagram of a generic block-based hybrid video encoding system. The input video signal is processed block by block (called coding units (CUs)). Different from the HEVC which partitions blocks only based on quad-trees, in the AVS3, one coding tree unit (CTU) is split into CUs to adapt to varying local characteristics based on quad/binary/extended-quad-tree. Additionally, the concept of multiple partition unit type in the HEVC is removed, i.e., the separation of CU, prediction unit (PU) and transform unit (TU) does not exist in the AVS3; instead, each CU is always used as the basic unit for both prediction and transform without further partitions. In the tree partition structure of the AVS3, one CTU is firstly partitioned based on a quad-tree structure. Then, each quad-tree leaf node can be further partitioned based on a binary and extended-quad-tree structure.

As shown in FIGS. 2A, 2B, 2C, 2D, and 2E, there are five splitting types, quaternary partitioning, horizontal binary partitioning, vertical binary partitioning, horizontal extended quad-tree partitioning, and vertical extended quad-tree partitioning.

Figure 2A:
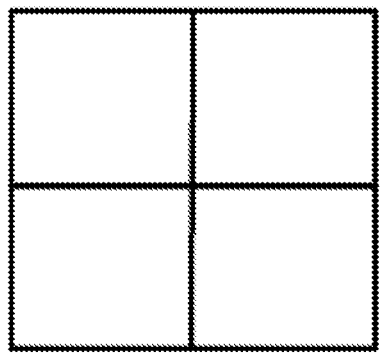
FIG. 2A is a diagram illustrating block partitions in a multi-type tree structure according to an example of the present disclosure.

FIG. 2A shows a diagram illustrating block quaternary partition in a multi-type tree structure, in accordance with the present disclosure.

Figure 2B:
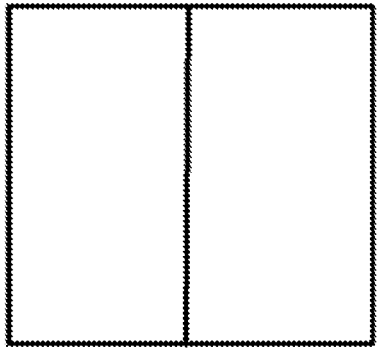
FIG. 2B is a diagram illustrating block partitions in a multi-type tree structure according to an example of the present disclosure.

FIG. 2B shows a diagram illustrating block vertical binary partition in a multi-type tree structure, in accordance with the present disclosure.

Figure 2C:
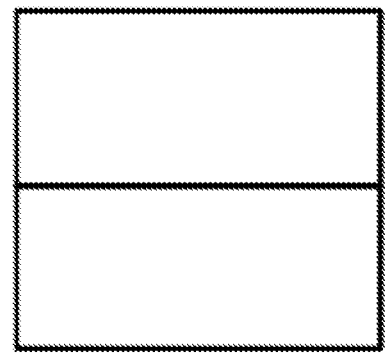
FIG. 2C is a diagram illustrating block partitions in a multi-type tree structure according to an example of the present disclosure.

FIG. 2C shows a diagram illustrating block horizontal binary partition in a multi-type tree structure, in accordance with the present disclosure.

Figure 2D:
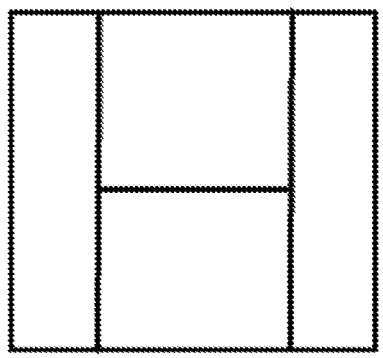
FIG. 2D is a diagram illustrating block partitions in a multi-type tree structure according to an example of the present disclosure.

FIG. 2D shows a diagram illustrating block vertical ternary partition in a multi-type tree structure, in accordance with the present disclosure.

Figure 2E:
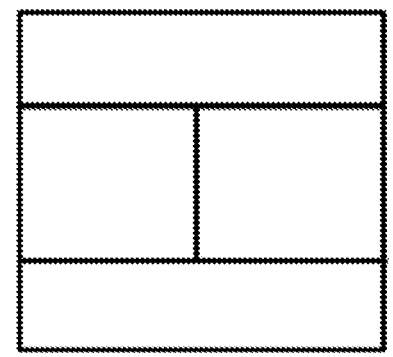
FIG. 2E is a diagram illustrating block partitions in a multi-type tree structure according to an example of the present disclosure.

FIG. 2E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes from. After spatial and/or temporal prediction, the mode decision block in the encoder chooses the best prediction mode, for example based on the rate-distortion optimization method. The prediction block is then subtracted from the current video block; and the prediction residual is de-correlated using transform and then quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used as reference to code future video blocks. To form the output video bitstream, coding mode (inter or intra), prediction mode information, motion information, and quantized residual coefficients are all sent to the entropy coding unit to be further compressed and packed.

Figure 3:
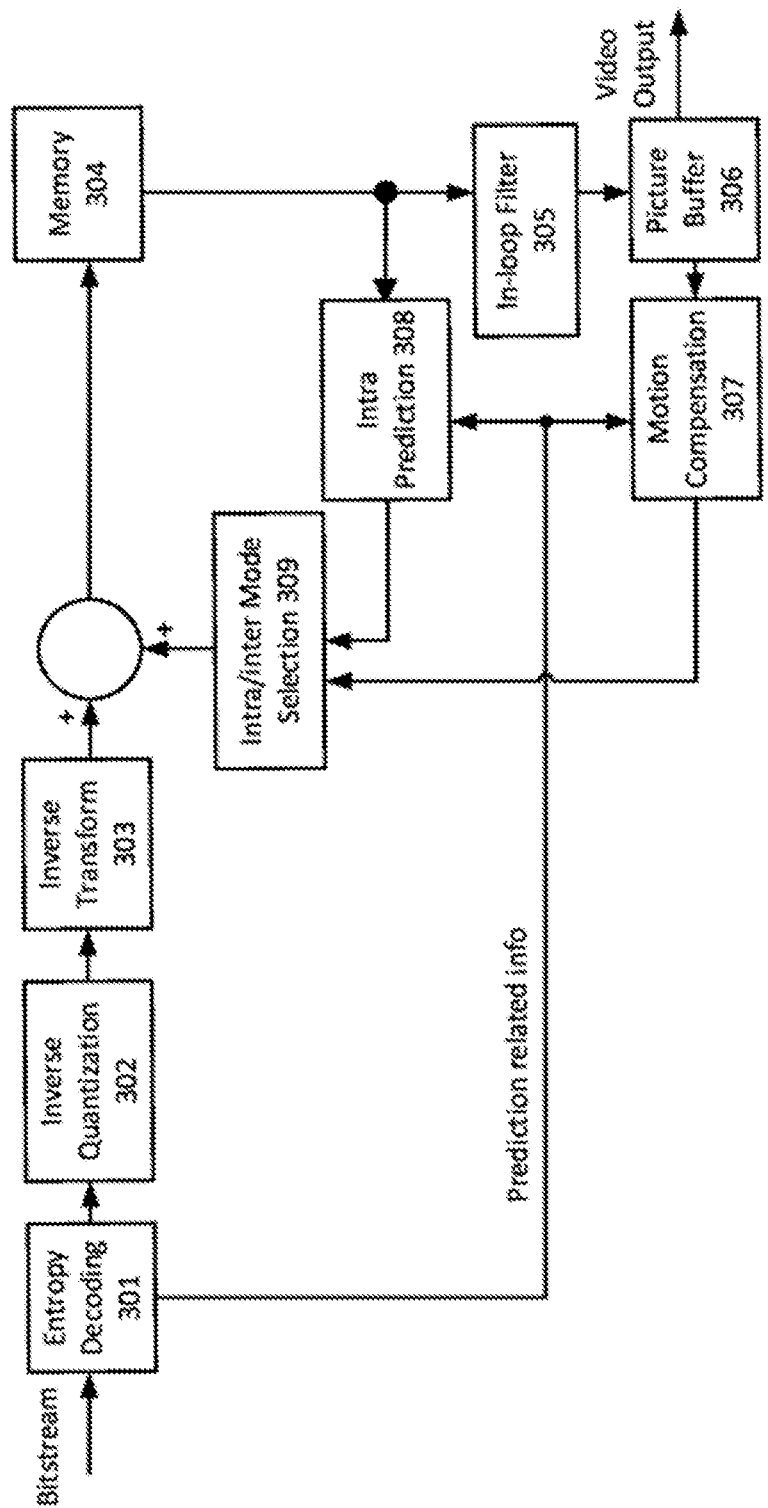
FIG. 3 is a block diagram of a decoder according to an example of the present disclosure.

FIG. 3 is a block diagram illustrating a block-based video decoder in accordance with some implementations of the present disclosure. The block-based video decoder may be the video decoder 30 as shown in FIG. 10. The video bit-stream is first entropy decoded at entropy decoding unit (e.g., entropy decoding 301). The coding mode and prediction information are sent to either the spatial prediction unit (if intra coded) (e.g., intra prediction 308) or the temporal prediction unit (if inter coded) (e.g., motion compensation 307) to form the prediction block. The residual transform coefficients are sent to inverse quantization unit (e.g., inverse quantization 302) and inverse transform unit (e.g., inverse transform 303) to reconstruct the residual block. The prediction block and the residual block are then added together (e.g., through intra/inter mode selection 309 and/or stored in memory 304). The reconstructed block may further go through in-loop filtering (e.g., in-loop filter 305) before it is stored in reference picture store (e.g., picture buffer 306). The reconstructed video in reference picture store is then sent out to drive a display device, as well as used to predict future video blocks.

The focus of the disclosure is to improve the coding performance of the geometric partition mode (GPM) that are used in both the VVC and the AVS3 standards. In the AVS3, the tool is also known as angular weighted prediction (AWP) which follows the same design spirit of GPM but with some subtle differences in certain design details. To facilitate the description of the disclosure, in the following, the existing GPM design in the VVC standard is used as an example to explain the main aspects of the GPM/AWP tool. Meanwhile, another existing inter-prediction technology called merge mode with motion vector differences (MMVD) that are applied in both VVC and AVS3 standards are also briefly reviewed, given that it is closely related with the proposed technologies in this disclosure. After that, some drawbacks of the current GPM/AWP design are identified. Finally, the proposed methods are provided in details. Please note that though the existing GPM design in the VVC standard is used as the example throughout the disclosure, to a person skilled in the art of modern video coding technologies, the proposed technologies can also be applied to other GPM/AWP designs or other coding tools with the same or similar design spirit.

Geometric Partition Mode (GPM)

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

Figure 4:
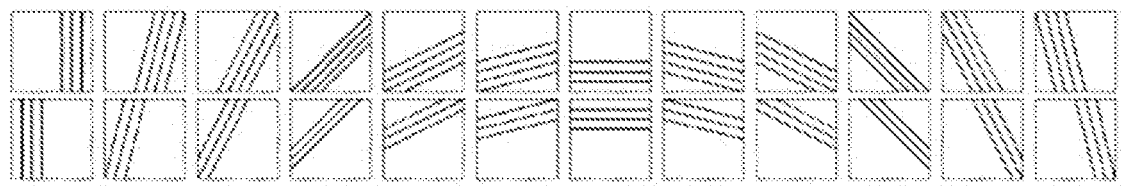
FIG. 4 is an illustration of allowed geometric partition mode (GPM) partitions according to an example of the present disclosure.

When this mode is used, a CU is split into two parts by a geometrically located straight line, as shown in FIG. 4 (description provided below). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level.

FIG. 4 shows allowed GPM partitions, where the splits in each picture have one identical split direction.

Uni-Prediction Candidate List Construction

To derive the uni-prediction motion vector for one geometric partition, one uni-prediction candidate list is firstly derived directly from the regular merge candidate list generation process. Denote n as the index of the uni-prediction motion in the uni-prediction candidate list. The LX motion vector of the n-th merge candidate, with X equal to the parity of n, is used as the n-th uni-prediction motion vector for geometric partitioning mode.

These motion vectors are marked with "x" in FIG. 5 (described below). In case a corresponding LX motion vector of the n-the extended merge candidate does not exist, the L(1−X) motion vector of the same candidate is used instead as the uni-prediction motion vector for geometric partitioning mode.

FIG. 5 shows a uni-prediction motion vector selection from the motion vectors of merge candidate list for the GPM.

Blending Along Geometric Partition Edge

After each geometric partition is obtained using its own motion, blending is applied to the two uni-prediction signals to derive samples around geometric partition edge. The blending weight for each position of the CU are derived based on the distance from each individual sample position to the corresponding partition edge.

GPM Signaling Design

According to the current GPM design, the usage of the GPM is indicated by signaling one flag at the CU-level. The flag is only signaled when the current CU is coded by either merge mode or skip mode. Specifically, when the flag is equal to one, it indicates the current CU is predicted by the GPM. Otherwise (the flag is equal to zero), the CU is coded by another merge mode such as regular merge mode, merge mode with motion vector differences, combined inter and intra prediction, and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 4). After that, two syntax elements merge_gpm_idx0 and merge_gpm_idx1 are signaled to indicate the indices of the uni-prediction merge candidates that are used for the first and second GPM partitions. More specifically, those two syntax elements are used to determine the uni-directional MVs of the two GPM partitions from the uni-prediction merge list as described in the section "uni-prediction merge list construction." According to the current GPM design, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. In details, if the second uni-prediction merge index is smaller than the first uni-prediction merge index, its original value is directly signaled. Otherwise (the second uni-prediction merge index is larger than the first uni-prediction merge index), its value is subtracted by one before being signaled to bitstream. At decoder side, the first uni-prediction merge index is firstly decoder. Then, for the decoding of the second uni-prediction merge index, if the parsed value is smaller than the first uni-prediction merge index, the second uni-prediction merge index is set equal to the parse value; otherwise (the parsed value is equal to or larger than the first uni-prediction merge index), the second uni-prediction merge index is set equal to the parsed value plus one. Table 1 illustrates the existing syntax elements that are used for the GPM mode in the current VVC specification.

TABLE 1

The existing GPM syntax elements in merge data syntax table of the VVC specification

|  | Descriptor |
|---|---|
| merge_data( x0, y0, cbWidth, cbHeight, chType ) { | |
| ...... | |
| if( !ciip_flag[ x0 ][ y0 ] ) { | |
|   merge_gpm_partition_idx[ x0 ][ y0 ] | ae(v) |
|   merge_gpm_idx0[ x0 ][ y0 ] | ae(v) |
|   if( MaxNumGpmMergeCand > 2 ) | |
|     merge_gpm_idx1[ x0 ][ y0 ] | ae(v) |
| } | |
| ...... | |
| } | |

On the other hand, in the current GPM design, truncated unary code is used for the binarization of the two uni-prediction merge indices, i.e., merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand-1 and MaxGPMMergeCand-2 for merge_gpm_idx0 and merge_gpm_idx1, respectively. MaxGPMMergeCand is the number of the candidates in the uni-prediction merge list.

When the GPM/AWP mode is applied, two different binarization methods are applied to translate the syntax merge_gpm_partition_idx into a string of binary bits. Specifically, the syntax element is binarized by fixed-length code and truncated binary code in the VVC and AVS3 standards, respectively. Meanwhile, for the AWP mode in the AVS3, different maximum values are used for the binarizations of the value of the syntax element. Specifically, in the AVS3, the number of the allowed GPM/AWP partition modes is 56 (i.e., maximum value of merge_gpm_partition_idx is 55) while the number is increased to 64 (i.e., maximum value of merge_gpm_partition_idx is 63) in the VVC.

Merge Mode with Motion Vector Differences (MMVD)

In addition to conventional merge mode which derives the motion information of one current block from its spatial/temporal neighbors, the MMVD/UMVE mode is introduced in both the VVC and AVS standards as one special merge mode. Specifically, in both the VVC and AVS3, the mode is signaled by one MMVD flag at coding block level. In the MMVD mode, the first two candidates in the merge list for regular merge mode are selected as the two base merge candidates for MMVD. After one base merge candidate is selected and signaled, additional syntax elements are signaled to indicate the motion vector differences (MVDs) that are added to the motion of the selected merge candidate. The MMVD syntax elements include a merge candidate flag to select the base merge candidate, a distance index to specify the MVD magnitude and a direction index to indicate the MVD direction.

Figures 6A, 6B:
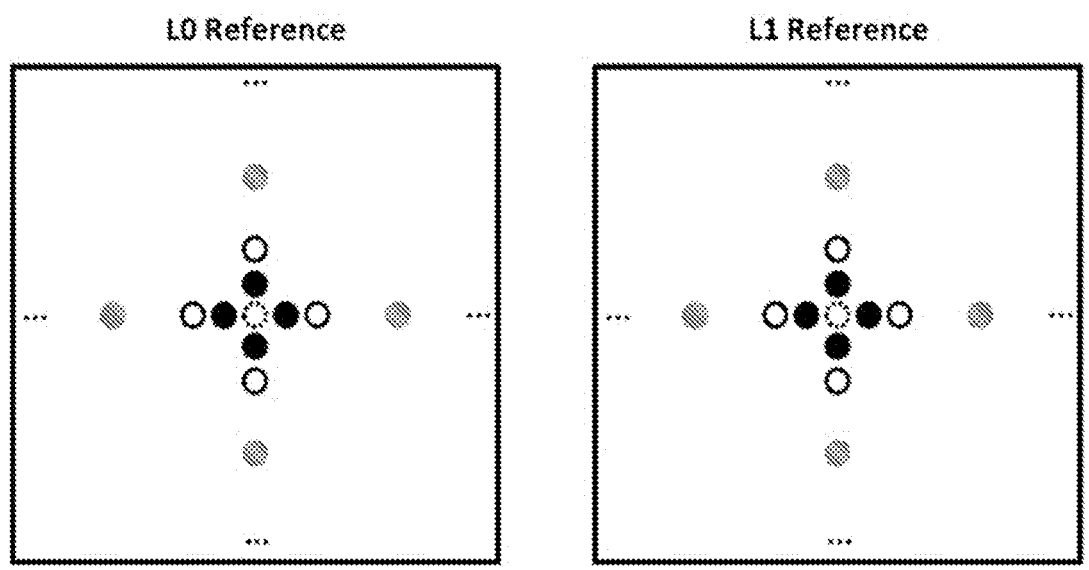
FIG. 6A is an illustration of a merge mode with motion vector differences (MMVD) mode according to an example of the present disclosure.
FIG. 6B is an illustration of an MMVD mode according to an example of the present disclosure.

In the existing MMVD design, the distance index specifies MVD magnitude, which is defined based on one set of predefined offsets from the starting point. As shown in FIGS. 6A and 6B, the offset is added to either horizontal or vertical component of the starting MV (i.e., the MVs of the selected base merge candidate).

FIG. 6A shows an MMVD mode for the L0 reference.
FIG. 6B shows an MMVD mode for the L1 reference.

Table 2 illustrates the MVD offset magnitudes that are applied in the AVS3, respectively.

TABLE 2

The MVD offset magnitude used in the AVS3

| Distance IDX | 0 | 1 | 2 | 3 | 4 |
|---|---|---|---|---|---|
| Offset Magnitude (in unit of luma sample) | ¼ | ½ | 1 | 2 | 4 |

As shown in Table 3, the direction index is used to specify the signs of the signaled MVD. It is noted that the meaning of the MVD sign could be variant according to the starting MVs. When the starting MVs is a uni-prediction MV or bi-prediction MVs with MVs pointing to two reference pictures whose POCs are both larger than the POC of the current picture, or both smaller than the POC of the current picture, the signaled sign is the sign of the MVD added to the starting MV. When the starting MVs are bi-prediction MVs pointing to two reference pictures with one picture's POC larger than the current picture and the other picture's POC smaller than the current picture, the signaled sign is applied to the L0 MVD and the opposite value of the signaled sign is applied to the L1 MVD.

TABLE 3

The MVD sign as specified by the direction index

| Direction IDX | 00 | 01 | 10 | 11 |
|---|---|---|---|---|
| x-axis | + | − | N/A | N/A |
| y-axis | N/A | N/A | + | − |

Motion Signaling for Regular Inter Mode

Similar to the HEVC standard, besides merge/skip modes, both VVC and AVS3 allows one inter CU to explicitly specify its motion information in bitstream. In overall, the motion information signaling in both VVC and AVS3 are kept the same as that in the HEVC standard. Specifically, one inter prediction syntax, i.e., inter_pred_idc, is firstly signaled to indicate whether the prediction signal from list L0, L1 or both. For each used reference list, the corresponding reference picture is identified by signaling one reference picture index ref_idx_lx (x=0, 1) for the corresponding reference list, and the corresponding MV is represented by one MVP index mvp_lx_flag (x=0, 1) which is used to select the MV predictor (MVP), followed by its motion vector difference (MVD) between the target MV and the selected MVP. Additionally, in the VVC standard, one control flag mvd_l1_zero_flag is signaled at slice level. When the mvd_l1_zero_flag is equal to 0, the L1 MVD is signaled in bitstream; otherwise (when the mvd_l1_zero_flag flag is equal to 1), the L1 MVD is not signaled and its value is always inferred to zero at encoder and decoder.

Bi-prediction with CU-level Weight

In the previous standards before VVC and AVS3, when the weighted prediction (WP) is not applied, the bi-prediction signal is generated by averaging the uni-prediction signals obtained from two reference pictures. In the VVC, one tool coding, namely bi-prediction with CU-level weight (BCW), was introduced to improve the efficiency of bi-prediction. Specifically, instead of simple averaging, the bi-prediction in the BCW is extended by allowing weighted averaging of two prediction signals, as depicted as:

$$P'(i,j)=((8-w) \cdot P_0(i,j)+w \cdot P_1(i,j)+4) \gg 3$$

In the VVC, when the current picture is one low-delay picture, the weight of one BCW coding block is allowed to be selected from a set of predefined weight values $w \in \{-2, 3, 4, 5, 10\}$ and weight of 4 represents traditional bi-prediction case where the two uni-prediction signals are equally weighted. For low-delay, only 3 weights $w \in \{3, 4, 5\}$ are allowed. Generally speaking, though there are some design similarities between the WP and the BCW, the two coding tools are targeting at solving the illumination change problem at different granularities. However, because the interaction between the WP and the BCW could potentially complicate the VVC design, the two tools are disallowed to be enabled simultaneously. Specifically, when the WP is enabled for one slice, then the BCW weights for all the bi-prediction CUs in the slice are not signaled and inferred to be 4 (i.e., the equal weight being applied).

Template Matching

Figure 7:
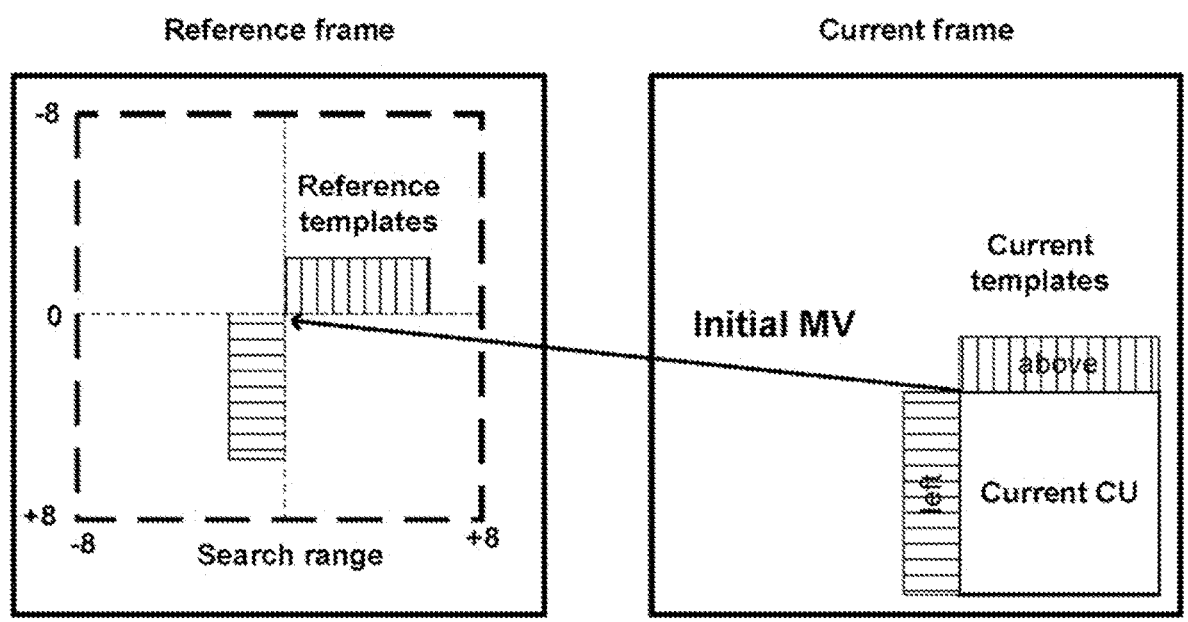
FIG. 7 is an illustration of a template matching (TM) algorithm according to an example of the present disclosure.

Template matching (TM) is a decoder side MV derivation method to refine the motion information of the current CU by finding the best match between one template which consists of top and left neighboring reconstructed samples of the current CU and a reference block (i.e., same size to the template) in a reference picture. As illustrated in FIG. 7, one MV is to be searched around the initial motion vector of the current CU within a [−8, +8]-pel search range. Best match may be defined as the MV that achieves the lowest matching cost, for example, sum of absolute difference (SAD), sum of absolute transformed difference (SATD) and so forth, between the current template and the reference template. There are two different ways to apply the TM mode for inter coding:

In AMVP mode, an MVP candidate is determined based on template matching difference to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in the below Table 14. This search process ensures that the MVP candidate still keeps the same MV precision as indicated by AMVR mode after TM process.

TABLE 14

| Search pattern | AMVR mode | | | Merge mode | |
| --- | --- | --- | --- | --- | --- |
| | Full-pel 4-pel | Full-pel | Half-pel | Quarter-pel | AltF = 0 | AltF = 1 |
| 4-pel diamond | v | | | | | |
| 4-pel cros | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As shown in the above table, TM may perform all the way down to ⅛-pel MVD precision or skip those beyond half-pel MVD precision, depending on whether the alternative interpolation filter (that is used when AMVR is of half-pel mode) is used according to merged motion information.

As mentioned above, the uni-directional motion that is used to generate the prediction samples of two GPM partitions are directly obtained from the regular merge candidates. In case there are not strong correlation between the MVs of spatial/temporal neighboring blocks, the derived uni-directional MV from merge candidates may not be accurate enough to capture the true motion of each GPM partition. Motion estimation is capable of offering more accurate motion which however comes at a cost of non-negligible signaling overhead due to arbitrary motion refinements that can be applied on top of the existing uni-directional MVs. On the other hand, the MVMD mode is utilized in both the VVC and AVS3 standards, which has been proven to be one efficient signaling mechanism to reduce the MVD signaling overhead. Therefore, it could be also beneficial to combine the GPM with the MMVD mode. Such combination can potentially improve the overall coding efficiency of the GPM tool by providing more accurate MVs to capture the individual motion of each GPM partition.

As discussed earlier, in both VVC and AVS3 standards, the GPM mode is only applied to merge/skip modes. Such design may not be optimal in terms of the coding efficiency given that all the non-merge inter CUs cannot benefit from the flexible non-rectangular partitions of the GPM. On the other hand, because of the same reason as above mentioned, the uni-prediction motion candidates derived from regular merge/skip modes are not always precise to capture the true motion of two geometric partitions. Based on such analyses, extra coding gain can be expected by reasonable extension of the GPM mode to non-merge inter modes (i.e., the CUs that explicitly signal their motion information in bitstream). However, improvements on MV accuracy comes at the cost of increased signaling overhead. Therefore, to efficiently apply the GPM mode to explicit inter modes, it would be important to identify one effective signaling scheme which can minimize the signaling cost while providing more accurate MVs for two geometric partitions.

Provided Methods

In this disclosure, methods are provided to further improve the coding efficiency of the GPM by applying further motion refinements on top of the existing uni-directional MVs that are applied to each GPM partition. The provided methods are named as geometric partition mode with motion vector refinement (GPM-MVR). Additionally, in the provided schemes, motion refinements are signaled in one similar manner of the existing MMVD design, i.e., based on a set of predefined MVD magnitudes and directions of the motion refinements.

In another aspect of the disclosure, solutions are provided to extend the GPM mode to explicit inter modes. To facilitate descriptions, those schemes are named as geometric partition mode with explicit motion signaling (GPM-EMS). Specifically, to achieve a better harmonization with regular inter mode, the existing motion signaling mechanism, i.e., MVP plus MVD, are utilized in the proposed GPM-EMS schemes to specify the corresponding uni-directional MVs of two geometric partitions.

Geometric Partition Mode with Separate Motion Vector Refinements

To improve the coding efficiency of the GPM, in this section, one improved geometric partition mode with separate motion vector refinements is proposed. Specifically, given a GPM partition, the proposed method firstly uses the existing syntax merge_gpm_idx0 and merge_gpm_idx1 to identify the uni-directional MVs for two GPM partitions from the existing uni-prediction merge candidate list and use them as the base MVs. After the two base MVs are determined, two set of new syntax elements are introduced to specify the values of motion refinements that are applied on top of the base MVs of the two GPM partitions separately. Specifically, two flags, namely, gpm_mvr_partIdx0_enable_flag and gpm_mvr_partIdx1_enable_flag, are firstly signal to indicate whether the GPM-MVR is applied to the first and second GPM partition, respectively. When the flag of one GPM partition is equal to one, the corresponding value of the MVR that is applied to the base MV of the partition is signaled in the MMVD style, i.e., one distance index (as indicated by the syntax elements gpm_mvr_partIdx0_distance_idx and gpm_mvr_partIdx1_distance_idx) to specify the magnitude of the MVR and one direction index (as indicated by the syntax elements gpm_mvr_partIdx0_direction_idx and gpm_mvr_partIdx1_distance_idx) to specify the direction of the MVR. Table 4 illustrates the syntax elements that are introduced by the proposed GPM-MVR methods.

TABLE 4

The syntax elements of the proposed GPM-MVR method with separate MVRs for two GPM partitions (Method One)

| merge data( x0, y0, cbWidth, cbHeight, chType ) { | Descriptor |
| --- | --- |
| ...... | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| merge_gpm_idx1[ x0 ][ y0 ] | ae(v) |
| gpm_mvr_partIdx0_enable_flag[ x0 ][ y0 ] | ae(v) |
| if( gpm_mvr_partIdx0_enable_flag[ x0 ][ y0 ] ) { | |

TABLE 4-continued

The syntax elements of the proposed GPM-MVR method with separate MVRs for two GPM partitions (Method One)

| merge data( x0, y0, cbWidth, cbHeight, chType ) { | Descriptor |
|---|---|
| gpm_mvr_partIdx0_directoin_idx[ x0 ][ y0 ] | ae(v) |
| gpm_mvr_partIdx0_distance_idx[ x0 ][ y0 ] | ae(v) |
| } | |
| if( merge_gpm_idx0 != merge_gpm_idx1 \|\| gpm_mvr_partIdx0_enable_flag ) | |
| gpm_mvr_partIdx1_enable_flag[ x0 ][ y0 ] | ae(v) |
| if( gpm_mvr_partIdx1_enable_flag[ x0 ][ y0 ] ) { | |
| gpm_mvr_partIdx1_direction_idx[ x0 ][ y0 ] | ae(v) |
| gpm_mvr_partIdx1_distance_idx[ x0 ][ y0 ] | ae(v) |
| } | |
| } | |
| ...... | |
| } | |

Based on the proposed syntax elements as shown in Table 4, at decoder, the final MV that is used for generating the uni-prediction samples of each GPM partition is equal to the sum of the signaled motion vector refinement and the corresponding base MV. In practice, different sets of MVR magnitudes and directions may be predefined and applied to the proposed GPM-MVR scheme, which can offer various tradeoffs between the motion vector accuracy and signaling overhead. In one specific example, it is proposed to reuse the eight MVD magnitudes (i.e., ¼-, ½-, 1, 2, 4, 8-, 16- and 32-pel) and four MVD directions (i.e., ±x- and y-axis) used in the VVC standard for the proposed GPM-MVR scheme. In another example, the existing five MVD magnitudes {¼-, ½-, 1, 2- and 4-pel} and four MVD directions (i.e., ±x- and y-axis) used in the AVS3 standard are applied in the proposed GPM-MVR scheme.

As discussed in the section "GPM signaling design," because the uni-directional MVs used for two GPM partitions cannot be identical, one constraint is applied in the existing GPM design that enforces the two uni-prediction merge indices to be different. However, in the proposed GPM-MVR scheme, further motion refinements are applied on top of the existing GPM uni-directional MVs. Therefore, even when the base MVs of two GPM partitions are identical, the final uni-directional MVs used for predicting two partitions could still be different as long as the values of two motion vector refinements are not the same. Based on the above consideration, the constraint (which restricts two uni-prediction merge indices to be different) is removed when the proposed GPM-MVR scheme is applied. Additionally, because the two uni-prediction merge indices are allowed to be identical, the same maximum value MaxGPMMergeCand-1 is used for the binarization of both merg_gpm_idx0 and merge_gpm_idx1, where MaxGPM-MergeCand is the number of the candidates in the uni-prediction merge list.

As analyzed above, when the uni-prediction merge indices (i.e., merge_gpm_idx0 and merge_gpm_idx1) of two GPM partitions are identical, the values of the two motion vector refinements cannot be the same to ensure the final MVs used for the two partitions are different. Based on such condition, in one embodiment of the disclosure, one signaling redundancy removal method is proposed to use the MVR of the first GPM partition to reduce the signaling overhead of the MVR of the second GPM partition, when the uni-prediction merge indices of two GPM partitions are the same (i.e., merge_gpm_idx0 is equal to merge_gpm_idx1). In one example, the following signaling conditions are applied:

First, when the flag gpm_mvr_partIdx0_enable_flag is equal to 0 (i.e., the GPM-MVR is not applied to the first GPM partition), the flag of gpm_mvr_partIdx1_enable_flag is not signaled but inferred to be 1 (i.e., GPM-MVR is applied to the second GPM partition).

Second, when both flags gpm_mvr_partIdx0_enable_flag and gpm_mvr_partIdx1_enable_flag are equal to 1 (i.e., GPM-MVR are applied to two GPM partitions) and gpm_mvr_partIdx0_direction_idx is equal to gpm_mvr_partIdx1_direction_idx (i.e., the MVRs of two GPM partitions have the same direction), the magnitude of the MVR of the first GPM partition (i.e., gpm_mvr_partIdx0_distance_idx) is used to predict the magnitude of the MVR of the second GPM partition (i.e., gpm_mvr_partIdx1_distance_idx). Specifically, if gpm_mvr_partIdx1_distance_idx is smaller than gpm_mvr_partIdx0_distance_idx, its original value is directly signaled. Otherwise (gpm_mvr_partIdx1_distance_idx is larger than gpm_mvr_partIdx0_distance_idx), its value is subtracted by one before being signaled to bitstream. At decoder side, for decoding the value of gpm_mvr_partIdx1_distance_idx, if the parsed value is smaller than gpm_mvr_partIdx0_distance_idx, gpm_mvr_partIdx1_distance_idx is set equal to the parse value; otherwise (the parsed value is equal to or larger than gpm_mvr_partIdx0_distance_idx), gpm_mvr_partIdx1_distance_idx is set equal to the parsed value plus one. In such case, to further reduce the overhead, different maximum values MaxGPMMVRDistance-1 and MaxGPMMVRDistance-2 can be used for the binarizations of gpm_mvr_partIdx0_distance_idx and gpm_mvr_partIdx1_distance_idx, where MaxGPMMVRDistance is number of allowed magnitudes for the motion vector refinements.

In another embodiment, it is proposed to switch the signaling order to gpm_mvr_partIdx0_direction_idx/ gpm_mvr_partIdx1_direction_idx and gpm_mvr_partIdx0_distance_idx/ gpm_mvr_partIdx1_distance_idx such that the MVR directions are signaled in front of the MVR magnitudes. By this way, following the same logics as described above, the encoder/decoder may use the MVR direction of the first GPM partition to condition the signaling of the MVR direction of the second GPM partition. In another embodiment, it is proposed to signaling the MVR magnitude and direction of the second GPM partition first and use them to condition the signaling of the MVR magnitude and direction of the first GPM partition.

In another embodiment, it is proposed to signal the GPM-MVR related syntax elements before the signaling of the existing GPM syntax elements. Specifically, in such design, the two flags gpm_mvr_partIdx0_enable_flag and gpm_mvr_partIdx1_enable_flag are firstly signal to indicate whether the GPM-MVR is applied to the first and second GPM partition, respectively. When the flag of one GPM partition is equal to one, the distance index (as indicated by the syntax elements gpm_mvr_partIdx0_distance_idx and gpm_mvr_partIdx1_distance_idx) and the direction index (as indicated by the syntax elements gpm_mvr_partIdx0_direction_idx and gpm_mvr_partIdx1_distance_idx) are signaled to specify the direction of the MVR. After that, the existing syntax merge_gpm_idx0 and merge_gpm_idx1 are signaled to identify the uni-directional MVs for two GPM partitions, i.e., based MVs. Table 5 illustrates the proposed GPM-MVR signaling scheme.

TABLE 5

The syntax elements of the proposed GPM-MVR method with separate MVRs for two GPM partitions (Method Two)

| merge_data( x0, y0, cbWidth, cbHeight, chType ) { | Descriptor |
|---|---|
| ...... | |
|     if( !ciip_flag[ x0 ][ y0 ] ) { | |
|       merge_gpm_partition_idx[ x0 ][ y0 ] | ae(v) |
|       gpm_mvr_partIdx0_enable_flag[ x0 ][ y0 ] | ae(v) |
|       if( gpm_mvr_partIdx0_enable_flag[ x0 ][ y0 ] ) { | |
|         gpm_mvr_partIdx0_direction_idx[ x0 ][ y0 ] | ae(v) |
|         gpm_mvr_partIdx0_distance_idx[ x0 ][ y0 ] | ae(v) |
|       } | |
|       gpm_mvr_partIdx1_enable_flag[ x0 ][ y0 ] | ae(v) |
|       if( gpm_mvr_partIdx1_enable_flag[ x0 ][ y0 ] ) { | |
|         gpm_mvr_partIdx1_direction_idx[ x0 ][ y0 ] | ae(v) |
|         gpm_mvr_partIdx1_distance_idx[ x0 ][ y0 ] | ae(v) |
|       } | |
|     } | |
|     merge_gpm_idx0[ x0 ][ y0 ] | ae(v) |
|     merge_gpm_idx1[ x0 ][ y0 ] | ae(v) |
| ...... | |
| } | |

Similar to the signaling method in Table 4, certain conditions may be applied when the GPM-MVR signaling method in Table 5 is applied to ensure that the resulting MVs used for the predictions of the two GPM partitions are not identical. Specifically, the following conditions are proposed to constraint the signaling of uni-prediction merge indices merge_gpm_idx0 and merge_gpm_idx1 depending on the values of the MVRs that are applied to the first and second GPM partitions:

First, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same;

Second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical.

Third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical.

Fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, and gpm_mvr_partIdx1_direction_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above four cases, when the values of merge_gpm_idx0 and merge_gpm_idx1 are disallowed to be identical, the index value of one partition can be used as a predictor for the index value of the other partition. In one method, it is proposed to firstly signal merge_gpm_idx0 and use its value to predict merge_gpm_idx1. Specifically, at an encoder, when merge_gpm_idx1 is greater than merge_gpm_idx0, the value of merge_gpm_idx1 that is sent to a decoder is reduced by 1. At the decoder, when the received value of merge_gpm_idx1 is equal to or greater than the received value of merge_gpm_idx0, the value of merge_gpm_idx1 is increased by 1. In another method, it is proposed to firstly signal merge_gpm_idx1 and use its value to predict merge_gpm_idx0. In such case, therefore, at the encoder, when merge_gpm_idx0 is greater than merge_gpm_idx1, the value of merge_gpm_idx0 that is sent to the decoder is reduced by 1. At the decoder, when the received value of merge_gpm_idx0 is equal to or greater than the received value of merge_gpm_idx1, the value of merge_gpm_idx0 is increased by 1. Additionally, similar to the existing GPM signaling design, different maximum values MaxGPMMergeCand-1 and MaxGPMMergeCand-2 can be used for the binarization of the first and second index values according to the signaling order, respectively. On the other hand, when the values of merge_gpm_idx0 and merge_gpm_idx1 are allowed to be identical because there is no correlation between the two index values, the same maximum value MaxGPMMergeCand-1 is used for the binarization of both two index values.

In the above method, in order to reduce the signaling cost, different maximum values may be applied for the binarization of the merge_gpm_idx0 and merge_gpm_idx1. The selection of the corresponding maximum value is dependent on the decoded values of the MVRs (as indicated by gpm_mvr_partIdx0_enable, gpm_mvr_partIdx1_enable, gpm_mvr_partIdx0_direction_idx, gpm_mvr_partIdx1_direction_idx, gpm_mvr_partIdx0_distance_idx and gpm_mvr_partIdx1_distance_idx_). Such design introduces undesirable parsing dependency between different GPM syntax elements, which might affect the overall parsing throughout. In order to solve such issue, in one embodiment, it is proposed to always one same maximum value (e.g., MaxGPMMergeCand-1) for parsing the values of merge_gpm_idx0 and merge_gpm_idx1. When such method is used, one bitstream conformance constraint may be used to prevent the two decoded MVs of two GPM partitions to be the same. In another method, is can also remove such non-identity constraint such that the decoded MVs of two GPM partitions are allowed to be the same. On the other hand, when such method is applied (i.e., using the same maximum values for merge_gpm_idx0 and merge_gpm_idx1), there is no parsing dependency between merge_gpm_idx0/merge_gpm_idx1 and other GPM-MVR syntax elements. Therefore, the order of signaling those syntax elements does not matter anymore. In one example, it is proposed to move the signaling of merge_gpm_idx0/merge_gpm_idx1 in front of the signaling of gpm_mvr_partIdx0_enable, gpm_mvr_partIdx1_enable, gpm_mvr_partIdx0_direction_idx, gpm_mvr_partIdx1_direction_idx, gpm_mvr_partIdx0_distance_idx and gpm_mvr_partIdx1_distance_idx.

Geometric Partition Mode with Symmetric Motion Vector Refinement

For the GPM-MVR methods discussed above, two separate MVR values are signaled with one being applied to improve the base MV of only one GPM partition. Such method can be efficient with regards to the improvement of prediction accuracy by allowing independent motion refinement for each GPM partition. However, such flexible motion refinement comes at a cost of increasing signaling overhead given that two different set of GMP-MVR syntax elements need to be sent from encoder to decoder. To reduce the signaling overhead, in this section, one geometric partition mode with symmetric motion vector refinement is proposed. Specifically, in this method, one single MVR value is signaled for one GPM CU and is used for both two GPM partitions according to the symmetry relationship between the picture order count (POC) values of the current picture and the reference pictures associated with two GPM partitions. Table 6 illustrates the syntax elements when the proposed method is applied.

TABLE 6

The syntax elements of the proposed GPM-MVR method with symmetric MVRs for two GPM partitions (Method One)

| merge_data( x0, y0, cbWidth, cbHeight, chType ) { | Descriptor |
|---|---|
| ...... | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| merge_gpm_idx1[ x0 ][ y0 ] | ae(v) |
| gpm_mvr_enable_flag[ x0 ][ y0 ] | ae(v) |
| if( gpm_mvr_enable_flag[ x0 ][ y0 ] ) { | |
| gpm_mvr_direction_idx[ x0 ][ y0 ] | ae(v) |
| gpm_mvr_distance_idx[ x0 ][ y0 ] | ae(v) |
| } | |
| ...... | |
| } | |

As shown in Table 6, after the base MVs of two GPM partitions are selected (based on merge_gpm_idx0 and merge_gpm_idx1), one flag gpm_mvr_enable_flag is signaled to indicate whether the GPM-MVR mode is applied to the current GPM CU or not. When the flag is equal to one, it indicates the motion refinement is applied to enhance the base MVs of two GPM partitions. Otherwise (when the flag is equal to zero), it indicates that the motion refinement is applied to neither of two partitions. If the GPM-MVR mode is enabled, additional syntax elements are further signaled to specify the values of the applied MVR by a direction index gpm_mvr_direction_idx and a magnitude index gpm_mvr_distance_idx. Additionally, similar to the MMVD mode, the meaning of MVR sign could be variant according to the relationship among the POCs of the current picture and two reference pictures of GPM partitions. Specifically, when both the POCs of two reference pictures are larger than or smaller than the POC of the current picture, the signaled sign is the sign of the MVR that is added to both two base MVs. Otherwise (when the POC of one reference picture is larger than the current picture while the POC of the other reference picture is smaller than the current picture), the signaled sign is applied to the MVR of the first GPM partition and the opposite sign is applied to the second GPM partition. In Table 6, the values of merge_gpm_idx0 and merge_gpm_idx1 are allowed to be identical.

In another embodiment, it is proposed to signal two different flags to separately control the enabling/disabling of the GPM-MVR mode for two GPM partitions separately. However, when the GPM-MVR mode is enabled, only one MVR is signaled based on the syntax elements gpm_mvr_direction_idx and gpm_mvr_distance_idx. The corresponding syntax table of such signaling method is illustrated in Table 7.

TABLE 7

The syntax elements of the proposed GPM-MVR method with symmetric MVRs for two GPM partitions (Method Two)

| merge_data( x0, y0, cbWidth, cbHeight, chType ) { | Descriptor |
|---|---|
| ...... | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| merge_gpm_idx1[ x0 ][ y0 ] | ae(v) |
| gpm_mvr_partIdx0_enable_flag[x0 ][ y0 ] | ae(v) |
| if( merge_gpm_idx0 != merge_gpm_idx1 \|\| gpm_mvr_partIdx0_enable_flag ) | |
| gpm_mvr_partIdx1_enable_flag[ x0 ][ y0 ] | ae(v) |
| if( gpm_mvr_partIdx0_enable_flag[ x0 ][ y0 ] \|\| gpm_mvr_partIdx1_enable_flag[ x0 ][ y0 ] ) { | |
| gpm_mvr_direction_idx[ x0 ][ y0 ] | ae(v) |
| gpm_mvr_distance_idx[ x0 ][ y0 ] | ae(v) |
| } | |
| ...... | |
| } | |

When the signaling method in Table 7 is applied, the values of merge_gpm_idx0 and merge_gpm_idx1 are allowed to be identical. However, to ensure that the resulting MVs applied to two GPM partitions are not redundant, when the flag gpm_mvr_partIdx0_enable_flag is equal to 0 (i.e., the GPM-MVR is not applied to the first GPM partition), the flag gpm_mvr_partIdx1_enable_flag is not signaled but inferred to be 1 (i.e., GPM-MVR is applied to the second GPM partition).

Adaptation of the Allowed MVRs for the GPM-MVR

In the GPM-MVR methods discussed above, one fixed group of MVR values are used for the GPM CUs at both encoder and decoder in one video sequence. Such design is suboptimal for video contents with high resolutions or with fierce motion. In those cases, the MVs tend to be much large such that fixed MVR values may not be optimal to capture the real motion of those blocks. To further improve the coding performance of the GPM-MVR mode, it is provided in this disclosure to support the adaptation of the MVR values that are allowed to be selected by the GPM-MVR mode at various coding level, such as sequence level, picture/slice picture, coding block group level and so forth. For example, multiple MVR sets as well as the corresponding code-words may be derived off-line according to the specific motion characteristics of different video sequences. The encoder may select the best MVR set and signal the corresponding index of the selected set to decoder.

In some embodiments of the disclosure, in addition to the default MVR offsets which include eight offset magnitudes (i.e., ¼-, ½-, 1, 2, 4, 8-, 16- and 32-pel) and four offset directions (i.e., ±x- and y-axis), another MVR offsets as defined in the below tables is proposed for the GPM-MVR mode. Table 15 illustrates proposed offset magnitudes in the second MVR offset set. Table 16 illustrates proposed offset directions in the second MVR offset set.

TABLE 15

| | Distance IDX | | | | | | | | |
|---|---|---|---|---|---|---|---|---|---|
| | 0 | 1 | 2 | 3 | 4 | 5 | 6 | 7 | 8 |
| Offset Magnitude (in unit of luma sample) | ¼ | ½ | 1 | 2 | 3 | 4 | 6 | 8 | 16 |

TABLE 16

| | \multicolumn{8}{c}{Direction IDX} | | | | | | | |
|---|---|---|---|---|---|---|---|---|
| | 000 | 001 | 010 | 011 | 100 | 101 | 110 | 111 |
| x-axis | +1 | −1 | 0 | 0 | +½ | −½ | −½ | +½ |
| y-axis | 0 | 0 | +1 | −1 | +½ | −½ | +½ | −½ |

In the above Table 15 and Table 16, the values +½ and −½ in the x-axis and y-axis indicate diagonal directions (+45° and −45°) of the horizontal and vertical directions. As shown in the Table 15 and Table 16, compared to the existing MVR offset set, the second MVR offset set introduces two new offset magnitudes (i.e., 3-pel and 6-pel) and four offset directions (45°, 135°, 225° and 315°). The newly added MVR offsets make the second MVR offset set more suitable for coding video blocks with sophisticated motion. Additionally, to enable the adaptive switch between the two MVR offset sets, one control flag is proposed to signal at one certain coding level (e.g., sequence, picture, slice, CTU and coding block and so forth) to indicate which set of the MVR offsets are selected for the GPM-MVR mode applied under the coding level. Assuming the proposed adaptation is carried out at picture level, the following Table 17 illustrates the corresponding syntax elements signaled at picture header.

TABLE 17

| picture_header_structure( ) { | Descriptor |
|---|---|
| ...... | |
|     if( sps_mmvd_fullpel_only_enabled_flag ) | |
|       ph_mmvd_fullpel_only_flag | u(1) |
|     presenceFlag = 0 | |
|     if( !pps_rpl_info_in_ph_flag ) /* This condition is intentionally not merged into the next, | |
|         to avoid possible interpretation of RplsIdx[ i ] not having a specified value. * / | |
|       presenceFlag = 1 | |
|     else if( num_ref_entries[ 1 ][ RplsIdx[ 1 ] ] > 0 ) | |
|       presenceFlag = 1 | |
|     if( presenceFlag ) { | |
|       ph_mvd_l1_zero_flag | u(1) |
|       if( sps_bdof_control_present_in_ph_flag ) | |
|         ph_bdof_disabled_flag | u(1) |
|       if( sps_dmvr_control_present_in_ph_flag ) | |
|         ph_dmvr_disabled_flag | u(1) |
|     } | |
|     if( !pps_rpl_info_in_ph_flag \|\| num_ref_entries[ 1 ][ RplsIdx[ 1 ] ] > 0 ) | |
|       ph_gpm_mvr_offset_set_flag | u(1) |
|     if( sps_prof_control_present_in_ph_flag ) | |
|       ph_prof_disabled_flag | u(1) |
| ...... | |
| } | |

In the above Table 17, the new flag ph_gpm_mvr_offset_set_flag is used to indicate the selection of the corresponding GPM MVR offsets that are used for the picture. When the flag is equal to 0, it means that the default MVR offsets (i.e., offset magnitudes of ¼-, ½-, 1, 2, 4, 8-, 16- and 32-pel and four offset directions +/−x- and y-axis) are applied to the GPM-MVR mode in the picture. Otherwise, when the flag is equal to 1, it means that the second MVR offsets (i.e., offset magnitudes of ¼-, ½-, 1, 2, 3, 4, 6, 8-, 16-pel and eight offset directions +/−x, y-axis and 45°, 135°, 225° and 315°) are applied to the GPM-MVR mode in the picture.

To signal the MVR offsets, different methods may be applied. Firstly, given that the MVR directions are usually statistically evenly distributed, it is proposed to use fixed-length codewords to binarize the MVR directions. Taking the default MVR offsets as example, there are in total four directions and the codewords of 00, 01, 10 and 11 can be used to represent the four directions. On the other hand, because the MVR offset magnitudes may have varying distributions which are adapted to the specific motion characteristics of the video content, it is proposed to use variable-length codewords to binarize the MVR offset magnitude. Table 18 below shows one specific codeword table that can be used for the binarization of the MVR offset magnitudes of the default MVR offset set and the second MVR offset set.

TABLE 18

| The default MVR offset set | | The second MVR offset set | |
|---|---|---|---|
| MVR offset magnitudes | Binarization | MVR offset magnitudes | Binarization |
| ¼-pel | 001 | ¼-pel | 001 |
| ½-pel | 1 | ½-pel | 1 |
| 1-pel | 01 | 1-pel | 01 |
| 2-pel | 0001 | 2-pel | 0001 |
| 4-pel | 00001 | 3-pel | 00001 |
| 8-pel | 000001 | 4-pel | 000001 |
| 16-pel | 0000001 | 6-pel | 0000001 |
| 32-pel | 0000000 | 8-pel | 00000001 |
| | | 16-pel | 00000000 |

In other embodiments, different fixed-length variable codewords may also be applied to binarize the MVR offset magnitudes of the default and second MVR offset sets, for instance, the bins "0" and "1" in the above codeword table may be exchanged for adapting to various 0/1 statistics of context-adaptive binary arithmetic coding (CABAC) engine.

In one specific example, two different codeword tables are provided to binarize the values of the MVR offset magnitude. The tables below illustrate the corresponding codewords of the default and secondary MVR offset sets that are applied in the first and second codeword tables. Table 19 shows the codewords of the MVR offset magnitudes in the first codeword table. Table 20 shows the codewords of the MVR offset magnitudes in the second codeword table.

TABLE 19

| The default MVR offset set | | The secondary MVR offset set | |
|---|---|---|---|
| MVR offset magnitudes | Binarization | MVR offset magnitudes | Binarization |
| ¼-pel | 1 | ¼-pel | 1 |
| ½-pel | 10 | ½-pel | 10 |
| 1-pel | 110 | 1-pel | 110 |
| 2-pel | 1110 | 2-pel | 1110 |
| 4-pel | 11110 | 3-pel | 11110 |
| 8-pel | 111110 | 4-pel | 111110 |
| 16-pel | 1111110 | 6-pel | 1111110 |
| 32-pel | 1111111 | 8-pel | 11111110 |
| | | 16-pel | 11111111 |

TABLE 20

| The default MVR offset set | | The secondary MVR offset set | |
|---|---|---|---|
| MVR offset magnitudes | Binarization | MVR offset magnitudes | Binarization |
| ¼-pel | 111110 | ¼-pel | 111110 |
| ½-pel | 1 | ½-pel | 1 |
| 1-pel | 10 | 1-pel | 10 |
| 2-pel | 110 | 2-pel | 110 |
| 4-pel | 1110 | 3-pel | 1110 |
| 8-pel | 11110 | 4-pel | 11110 |
| 16-pel | 1111110 | 6-pel | 1111110 |
| 32-pel | 1111111 | 8-pel | 11111110 |
| | | 16-pel | 11111111 |

To enable the adaptive switch between the two codeword tables, one indication flag is proposed to signal at one certain coding level (e.g., sequence, picture, slice, CTU and coding block and so forth) to specify which codeword table is used to binarize the MVR offset magnitude under the coding level. Assuming the proposed adaptation is carried out at picture level, Table 21 below illustrates the corresponding syntax element signaled at picture header where newly added syntax elements are italic bold.

selection of the corresponding codeword table that is used for binarization of the MVR offset magnitude of the picture. When the flag is equal to 0, it indicates that the first codeword table is applied for the picture; otherwise (i.e., the flag is equal to 1), it indicates that the second codeword table is applied for the picture.

In another embodiment, it is proposed to always use one codeword table for binarizing the MVR offset magnitudes during the encoding/decoding of the whole video sequence. In one example, it is proposed to always use the first codeword table for the binarization of the MVR offset magnitude. In another example, it is proposed to always use the second codeword table for the binarization of the MVR offset magnitude.

In other method, one statistic-based binarization method may be applied to adaptively design optimal codewords for the MVR offset magnitudes on-the-fly without signaling. The statistics that are used to determine the optimal codewords may be, but not limited to, the probability distribution of MVR offset magnitudes being collected on a number of previously coded pictures, slices, and/or coding blocks. The codewords may be re-determined/updated at various frequency level. For example, the update may be done every time a CU is coded in GPM-MVR mode. In another example, the update may be re-determined and/or updated every time there are a number of CUs, e.g., 8, or 16, coded in GPM-MVR mode.

In other method, instead of redesigning one new set of codewords, the proposed statistic-based method can also be used for re-ordering the MVR offset magnitude values based on the same set of codewords in order to assign shorter codewords to the magnitudes that are more used and longer codewords to the magnitudes that are less used. Taking the following table as an example, assuming the statistic is collected at picture level, the column "Usage" indicates the corresponding percentages of different MVR offset magnitudes that are used by the GPM-MVR coding blocks in the previously coded picture. According to the values in the

TABLE 21

| picture_header_structure( ) { | Descriptor |
|---|---|
| ...... | |
|     if( sps_mmvd_fullpel_only_enabled_flag ) | |
|       ph_mmvd_fullpel_only_flag | u(1) |
|     presenceFlag = 0 | |
|     if( !pps_rpl_info_in_ph_flag ) /* This condition is intentionally not merged into the next, to avoid possible interpretation of RplsIdx[ i ] not having a specified value. */ | |
|       presenceFlag = 1 | |
|     else if( num_ref_entries[ 1 ][ RplsIdx[ 1 ] ] > 0 ) | |
|       presenceFlag = 1 | |
|     if( presenceFlag ) { | |
|       ph_mvd_l1_zero_flag | u(1) |
|       if( sps_bdof_control_present_in_ph_flag ) | |
|         ph_bdof_disabled_flag | u(1) |
|       if( sps_dmvr_control_present_in_ph_flag ) | |
|         ph_dmvr_disabled_flag | u(1) |
|     } | |
|     *if( !pps_rpl_info_in_ph_flag \|\| num_ref_entries[ 1 ][ RplsIdx[ 1 ] ] > 0 ) {* | |
|       *ph_gpm_mvr_offset_set_flag* | *u(1)* |
|       *ph_gpm_mvr_step_codeword_flag* | *u(1)* |
|     *}* | |
|     if( sps_prof_control_present_in_ph_flag ) | |
|     ph_prof_disabled_flag | u(1) |
| ...... | |
| } | |

In the above syntax table, the new flag ph_gpm_mvr_step_codeword_flag is used to indicate the "Usage" column, using the same binarization method (i.e., truncated unary codewords), the encoder/decoder may order the MVR offset magnitude values based on their usage; after that, the encoder/decoder can assign the shortest codeword (i.e., "1") to the most frequently used MVR offset magnitude (i.e., 1-pel), and the second shortest codeword (i.e., "01") to the second most frequently used MVR offset magnitude (i.e., ½-pel), . . . , and the longest codewords (i.e., "0000001" and "0000000") to the two most seldomly used MVR offset magnitudes (i.e., 16-pel and 32-pel). As such, by such re-ordering scheme, the same set of codewords can be freely reordered to accommodate the dynamic change of statistic distribution of the MVR offset magnitudes.

| MVR offset magnitudes | Usage | Binarization |
|---|---|---|
| ¼-pel | 15% | 001 |
| ½-pel | 20% | 01 |
| 1-pel | 30% | 1 |
| 2-pel | 10% | 0001 |
| 4-pel | 9% | 00001 |
| 8-pel | 6% | 000001 |
| 16-pel | 5% | 0000001 |
| 32-pel | 5% | 0000000 |

Encoder Speed-Up Logics for GPM-MVR Rate-Distortion Optimization

For the proposed GPM-MVR schemes, to determine the optimal MVR for each GPM partition, encoder may need to test the rate-distortion cost of each GPM partition multiple times, each with varying the MVR values that are being applied. This could significantly increase the encoding complexity of the GPM mode. In order to address the encoding complexity issue, the following fast encoding logics are provided in this section:

First, due to the quad-/binary-/ternary-tree block partition structure that is applied in the VVC and AVS3, one same coding block can be checked during the rate-distortion optimization (RDO) process, each divided through one different partition path. In the current VTM/HPM encoder implementations, the GPM and GPM-MVR modes along with other inter and intra coding modes are always tested whenever one same CU is obtained through different block partition combinations. Generally speaking, for different partition paths, only the neighboring blocks of one CU could be different, which, however, should have a relatively minor impact on the optimal coding mode that one CU will select. Based on such consideration, to reduce the total number of GPM RDO being applied, it is proposed to store the decision whether the GPM mode is selected when the RD cost of one CU is checked for the first time. After that, when the same CU is checked by the RDO process again (by another partition path), the RD cost of the GPM (including GPM-MVR) is checked only if the GPM is selected for the CU at the first time. In case when the GPM is not selected for the initial RD checking of one CU, only the GPM (without GPM-MVR) is tested when the same CU is achieved through another partition path. In another method, when the GPM is not selected for the initial RD checking of one CU, both the GPM and GPM-MVR are not tested when the same CU is achieved through another partition path.

Second, to reduce the number of GPM partitions for the GPM-MVR mode, it is proposed to maintain the first M GPM partition modes with the smallest RD costs when the RD cost of one CU is checked for the first time. After that, when the same CU is checked by the RDO process again (by another partition path), only those M GPM partition modes are tested for the GPM-MVR mode.

Third, to reduce the number of GPM partitions that are tested for the initial RDO process, for each GPM partition, it is proposed to firstly calculate the sum absolute difference (SAD) values when using different uni-prediction merge candidates for two GPM partitions. Then, for each GPM partition under one specific partition mode, select the best uni-prediction merge candidate with the smallest SAD values and calculate the corresponding SAD value of the partition mode which is equal to the sum of the SAD values of best uni-prediction merge candidates for two GPM partition. Then, for the following RD process, only the first N partition modes with the best SAD values for the previous step are tested for the GPM-MVR mode.

Geometric Partition with Explicit Motion Signaling

In this section, multiple methods are proposed to extend the GPM mode to the bi-prediction of regular inter mode where the two uni-directional MVs of the GPM mode are explicitly signaled from encoder to decoder.

The first solution (Solution One) provides a method to fully reuse the existing motion signaling of bi-prediction to signal the two uni-directional MVs of the GPM mode. Table 8 illustrates the modified syntax table of the proposed scheme where newly added syntax elements are italic bold. As shown in Table 8, in the solution, all the existing syntax elements of signaling L0 and L1 motion information are fully reused to indicate the uni-directional MVs of two GPM partitions respectively. Additionally, it is assumed that the L0 MV is always associated with the first GPM partition and the L1 MV is always associated with the second GPM partition. One the other hand, in Table 8, the inter prediction syntax, i.e., inter_pred_idc, is signaled in front of the GPM flag (i.e., gpm_flag) such that the value of the inter_pred_idc can be used to condition the presence of gpm_flag. Specifically, the flag gpm_flag only need to be signaled when inter_pred_idc is equal to PRED_BI (i.e., bi-prediction) and both inter_affine_flag and sym_mvd_flag are equal to 0 (i.e., the CU is coded by neither affine mode nor SMVD mode). When the flag gpm_flag is not signaled, its value is always inferred to be 0 (i.e., the GPM mode is disabled). When gpm_flag is 1, another syntax element gpm_partition_idx is further signaled to indicate the selected GPM mode (out of total 64 GPM partitions) for the current CU.

TABLE 8

The modified syntax table for motion signaling of Solution One (Option One)

```
if( sh_slice_type = = B )
    inter_pred_idc[ x0 ][ y0 ]                                              ae(v)
if( sps_affine_enabled_flag && cbWidth >= 16 && cbHeight >= 16 ) {
    inter_affine_flag[ x0 ][ y0 ]                                           ae(v)
    if( sps_6param affine_enabled flag && inter_affine_flag[ x0 ][ y0 ] )
        cu_affine_type_flag[ x0 ][ y0 ]                                     ae(v)
}
if( sps_smvd_enabled_flag && !ph_mvd_l1_zero_flag &&
    inter_pred_idc[ x0 ][ y0 ] = = PRED_BI &&
```

TABLE 8-continued

The modified syntax table for motion signaling of Solution One (Option One)

```
        !inter_affine_flag[ x0 ][ y0 ] && RefIdxSymL0 > -1 && RefIdxSymL1 >
-1 )
            sym_mvd_flag[ x0 ][ y0 ]                                          ae(v)
        if( inter_pred_idc[ x0 ][ y0 ] != PRED_L1 ) {
            if( NumRefIdxActive[ 0 ] > 1 && !sym_mvd_flag[ x0 ][ y0 ] )
                ref_idx_l0[ x0 ][ y0 ]                                        ae(v)
            mvd_coding(x0, y0, 0, 0 )
            if( MotionModelIdc[ x0 ][ y0 ] > 0 )
                mvd_coding(x0, y0, 0, 1 )
            if(MotionModelIdc[ x0 ][ y0 ] > 1 )
                mvd_coding(x0, y0, 0, 2 )
            mvp_l0_flag[ x0 ][ y0 ]                                           ae(v)
        } else {
            MvdL0[ x0 ][ y0 ][ 0 ] = 0
            MvdL0[ x0 ][ y0 ][ 1 ] = 0
        }
        if( inter_pred_idc[ x0 ][ y0 ] != PRED_L0 ) {
            if( NumRefIdxActive[ 1 ] > 1 && !sym_mvd_flag[ x0 ][ y0 ] )
                ref_idx_l1[ x0 ][ y0 ]                                        ae(v)
            if( ph_mvd_l1_zero_flag && inter_pred_idc[ x0 ][ y0 ] = = PRED_BI ) {
                MvdL1[ x0 ][ y0 ][ 0 ] = 0
                MvdL1[ x0 ][ y0 ][ 1 ] = 0
                MvdCpL1[ x0 ][ y0 ][ 0 ][ 0 ] = 0
                MvdCpL1[ x0 ][ y0 ][ 0 ][ 1 ] = 0
                MvdCpL1[ x0 ][ y0 ][ 1 ][ 0 ] = 0
                MvdCpL1[ x0 ][ y0 ][ 1 ][ 1 ] = 0
                MvdCpL1[ x0 ][ y0 ][ 2 ][ 0 ] = 0
                MvdCpL1[ x0 ][ y0 ][ 2 ][ 1 ] = 0
            } else {
                if( sym_mvd_flag[ x0 ][ y0 ] ) {
                    MvdL1[x0 ][ y0 ][ 0 ] = -MvdL0[ x0 ][ y0 ][ 0 ]
                    MvdL1[ x0 ][ y0 ][ 1 ] = -MvdL0[ x0 ][ y0 ][ 1 ]
                } else
                    mvd_coding(x0, y0, 1, 0 )
                if( MotionModelIdc[ x0 ][ y0 ] > 0 )
                    mvd_coding(x0, y0, 1, 1 )
                if(MotionModelIdc[ x0 ][ y0 ] > 1 )
                    mvd_coding(x0, y0, 1, 2 )
            }
            mvp_l1_flag[ x0 ][ y0 ]                                           ae(v)
        } else {
            MvdL1[ x0 ][ y0 ][ 0 ] = 0
            MvdL1[ x0 ][ y0 ][ 1 ] = 0
        }
        if( inter_pred_idc[x0 ][ y0 ] = = PRED_BI && !inter_affine_flag[ x0 ][ y0 ]
&& !sym_mvd_flag[x0 ][ y0 ] && cbWidth >= 8 && cbHeight >= 8 &&
            cbWidth < ( 8 * cbHeight ) && cbHeight < ( 8 * cbWidth ) &&
            cbWidth < 128 && cbHeight < 128 ) {
            gpm_flag[ x0 ][ y0 ]                                              ae(v)
            if( gpm_partition_flag[ x0 ][ y0 ] ) {
                gpm_partition_idx[ x0 ][ y0 ]                                 ae(v)
            }
```

In another method, it is proposed to place the signaling of the flag gpm_flag in front of the other inter signaling syntax elements such that the value of gpm_flag can be used to determine whether the other inter syntax elements need to be present or not. Table 9 illustrates the corresponding syntax table when such method is applied where newly added syntax elements are italic bold. As it can be seen, the gpm_flag is firstly signaled in Table 9. When the gpm_flag is equal to 1, the corresponding signaling of inter_pred_idc, inter_affine_flag and sym_mvd_flag can be bypassed. Instead, the corresponding values of three syntax elements can be inferred as PRED_BI, 0 and 0, respectively.

TABLE 9

The modified syntax table for motion signaling of Solution One (Option Two)

```
        if(sh_slice_type == B && cbWidth >= 8 && cbHeight >= 8 &&
            cbWidth < ( 8 * cbHeight ) && cbHeight < ( 8 * cbWidth ) &&
            cbWidth < 128 && cbHeight < 128) {
            gpm_flag[ x0 ][ y0 ]                                              ae(v)
            if( gpm_partition_flag[ x0 ][ y0 ] ) {
                gpm_partition_idx[ x0 ][ y0 ]                                 ae(v)
            }
        if( sh_slice_type == B && !gpm_flag[ x0 ][ y0 ] )
            inter_pred_idc[ x0 ][ y0 ]                                        ae(v)
        if( sps_affine_enabled_flag && !gpm_flag[ x0 ][ y0 ] && cbWidth >= 16 &&
```

TABLE 9-continued

The modified syntax table for motion signaling of Solution One (Option Two)

```
cbHeight >= 16 ) {
        inter_affine_flag[ x0 ][ y0 ]                                              ae(v)
        if( sps_6param_affine_enabled_flag && inter_affine_flag[ x0 ][ y0 ] )
            cu_affine_type_flag[ x0 ][ y0 ]                                        ae(v)
    }
    if( sps_smvd_enabled_flag && !ph_mvd_l1_zero_flag &&
        inter_pred_idc[ x0 ][ y0 ] == PRED_BI && !gpm_flag[ x0 ][ y0 ] &&
        !inter_affine_flag[ x0 ][ y0 ] && RefIdxSymL0 > -1 && RefIdxSymL1 >
-1 )
        sym_mvd_flag[ x0 ][ y0 ]                                                   ae(v)
    if( inter_pred_idc[ x0 ][ y0 ] != PRED_L1 ) {
        if( NumRefIdxActive[ 0 ] > 1 && !sym_mvd_flag[ x0 ][ y0 ] )
            ref_idx_l0[ x0 ][ y0 ]                                                 ae(v)
        mvd_coding(x0, y0, 0, 0 )
        if( MotionModelIdc[ x0 ][ y0 ] > 0 )
            mvd_coding(x0, y0, 0, 1 )
        if(MotionModelIdc[ x0 ][ y0 ] > 1 )
            mvd_coding(x0, y0, 0, 2 )
        mvp_l0_flag[ x0 ][ y0 ]                                                    ae(v)
    } else {
        MvdL0[ x0 ][ y0 ][ 0 ] = 0
        MvdL0[ x0 ][ y0 ][ 1 ] = 0
    }
    if( inter_pred_idc[ x0 ][ y0 ] != PRED_L0 ) {
        if( NumRefIdxActive[ 1 ] > 1 && !sym_mvd_flag[ x0 ][ y0 ] )
            ref_idx_l1[ x0 ][ y0 ]                                                 ae(v)
        if( ph_mvd_l1_zero_flag && inter_pred_idc[ x0 ][ y0 ] = = PRED_BI ){
            MvdL1[ x0 ][ y0 ][ 0 ] = 0
            MvdL1[ x0 ][ y0 ][ 1 ] = 0
            MvdCpL1[ x0 ][ y0 ][ 0 ][ 0 ] = 0
            MvdCpL1[ x0 ][ y0 ][ 0 ][ 1 ] = 0
            MvdCpL1[ x0 ][ y0 ][ 1 ][ 0 ] = 0
            MvdCpL1[ x0 ][ y0 ][ 1 ][ 1 ] = 0
            MvdCpL1[ x0 ][ y0 ][ 2 ][ 0 ] = 0
            MvdCpL1[ x0 ][ y0 ][ 2 ][ 1 ] = 0
        } else {
            if( sym_mvd_flag[ x0 ][ y0 ] ) {
                MvdL1[ x0 ][ y0 ][ 0 ] = -MvdL0[ x0 ][ y0 ][ 0 ]
                MvdL1[ x0 ][ y0 ][ 1 ] = -MvdL0[ x0 ][ y0 ][ 1 ]
            } else
                mvd_coding(x0, y0, 1, 0 )
            if( MotionModelIdc[ x0 ][ y0 ] > 0 )
                mvd_coding(x0, y0, 1, 1 )
            if(MotionModelIdc[ x0 ][ y0 ] > 1 )
                mvd_coding(x0, y0, 1, 2 )
        }
        mvp_l1_flag[ x0 ][ y0 ]                                                    ae(v)
    } else {
        MvdL1[ x0 ][ y0 ][ 0 ] = 0
        MvdL1[ x0 ][ y0 ][ 1 ] = 0
    }
```

In both Table 8 and Table 9, the SMVD mode cannot be combined with the GPM mode. In another example, it is proposed to allow the SMVD mode when the current CU is coded by the GPM mode. When such combination is allowed, by following the same design of the SMVD, the MVD of the two GPM partitions are assumed to be symmetric such that only the MVD of the first GPM partition needs to be signaled and the MVD of the second GPM partition is always symmetric to the first MVD. When such method is applied, the corresponding signaling condition of sym_mvd_flag on gpm_flag can be removed.

As illustrated above, in the first solution, it always assumes L0 MV to be used for the first GPM partition and the L1 MV to be used for the second GPM partition. Such design may not be optimal in the sense that this method prohibits the MVs of two GPM partitions to come from one same prediction list (either L0 or L1). To resolve such problem, one alternative GPM-EMS scheme, Solution Two, is proposed with the signaling design as illustrated in Table 10. In Table 10, newly added syntax elements are italic bold.

As shown in Table 10, the flag gpm_flag is firstly signaled. When the flag is equal to 1 (i.e., the GPM is enabled), the syntax gpm_partition_idx is signaled to specify the selected GPM mode. Then, one additional flag gpm_pred_dir_flag0 is signaled to indicate the corresponding prediction list that the MV of the first GPM partition is from. When the flag gpm_pred_dir_flag0 is equal to 1, it indicates that the MV of the first GPM partition comes from L1; otherwise (the flag is equal to 0), it indicates that the MV of the first GPM partition comes from L0. After that, the existing syntax elements ref_idx_l0, mvp_l0_flag and mvd_coding( ) are utilized to signal the values of reference picture index, mvp index and the MVD of the first GPM partition. On the other hand, similar to the first partition, another syntax element gpm_pred_dir_flag1 is introduced to select the corresponding prediction list of the second GPM partition, followed by the existing syntax elements ref_idx_l1, mvp_l1_flag and mvd_coding( ) to be used for deriving the MV of the second GPM partition.

TABLE 10

The modified syntax table for motion signaling of Solution Two

```
if(sh_slice_type == B && cbWidth >= 8 && chHeight >= 8 &&
      cbWidth < ( 8 * cbHeight ) && cbHeight < ( 8 * cbWidth ) &&
      cbWidth < 128 && cbHeight < 128) {
   gpm_flag[ x0 ][ y0 ]                                              ae(v)
   if( gpm_partition_flag[ x0 ][ y0 ] ) {
      gpm_partition_idx[ x0 ][ y0 ]                                  ae(v)
      gpm_pred_dir_flag0[ x0 ][ y0 ]                                 ae(v)
      ref_idx_l0[ x0 ][ y0 ]                                         ae(v)
      mvd_coding(x0, y0, 0, 0 )
      mvp_l0_flag[ x0 ][ y0 ]                                        ae(v)
      gpm_pred_dir_flag1[ x0 ][ y0 ]                                 ae(v)
      ref_idx_l1[ x0 ][ y0 ]                                         ae(v)
      mvd_coding( x0, y0, 0, 0 )
      mvp_l1_flag[ x0 ][ y0 ]                                        ae(v)
   } else {
   if( sh_slice_type = = B )
      inter_pred_idc[ x0 ][ y0 ]                                     ae(v)
   if( sps_affine_enabled_flag && cbWidth >= 16 && cbHeight >= 16 ) {
      inter_affine_flag[ x0 ][ y0 ]                                  ae(v)
      if( sps_6param_affine_enabled_flag && inter_affine_flag[ x0 ][ y0 ] )
         cu_affine_type_flag[ x0 ][ y0 ]                             ae(v)
   }
   if( sps_smvd_enabled_flag && !ph_mvd_l1_zero_flag &&
         inter_pred_idc[ x0 ][ y0 ] = = PRED_BI &&
         !inter_affine_flag[ x0 ][ y0 ] && RefIdxSymL0 > -1 && RefIdxSymL1 >
-1 )
      sym_mvd_flag[ x0 ][ y0 ]                                       ae(v)
   if( inter_pred_idc[ x0 ][ y0 ] != PRED_L1 ) {
      if( NumRefIdxActive[ 0 ] > 1 && !sym_mvd_flag[ x0 ][ y0 ] )
         ref_idx_l0[ x0 ][ y0 ]                                      ae(v)
      mvd_coding(x0, y0, 0, 0 )
      if( MotionModelIdc[ x0 ][ y0 ] > 0 )
         mvd_coding(x0, y0, 0, 1 )
      if(MotionModelIdc[ x0 ][ y0 ] > 1 )
         mvd_coding(x0, y0, 0, 2 )
      mvp_l0_flag[ x0 ][ y0 ]                                        ae(v)
   } else {
      MvdL0[ x0 ][ y0 ][ 0 ] = 0
      MvdL0[ x0 ][ y0 ][ 1 ] = 0
   }
   if( inter_pred_idc[ x0 ][ y0 ] != PRED_L0 ) {
      if( NumRefIdxActive[ 1 ] > 1 && !sym_mvd_flag[ x0 ][ y0 ] )
         ref_idx_l1[ x0 ][ y0 ]                                      ae(v)
      if( ph_mvd_l1_zero_flag && inter_pred_idc[ x0 ][ y0 ] = = PRED_BI ){
         MvdL1[ x0 ][ y0 ][ 0 ] = 0
         MvdL1[ x0 ][ y0 ][ 1 ] = 0
         MvdCpL1[ x0 ][ y0 ][ 0 ][ 0 ] = 0
         MvdCpL1[ x0 ][ y0 ][ 0 ][ 1 ] = 0
         MvdCpL1[ x0 ][ y0 ][ 1 ][ 0 ] = 0
         MvdCpL1[ x0 ][ y0 ][ 1 ][ 1 ] = 0
         MvdCpL1[ x0 ][ y0 ][ 2 ][ 0 ] = 0
         MvdCpL1[ x0 ][ y0 ][ 2 ][ 1 ] = 0
      } else {
         if( sym_mvd_flag[ x0 ][ y0 ] ) {
            MvdL1[ x0 ][ y0 ][ 0 ] = -MvdL0[ x0 ][ y0 ][ 0 ]
            MvdL1[ x0 ][ y0 ][ 1 ] = -MvdL0[ x0 ][ y0 ][ 1 ]
         } else
            mvd_coding(x0, y0, 1, 0 )
         if( MotionModelIdc[ x0 ][ y0 ] > 0 )
            mvd_coding(x0, y0, 1, 1 )
         if(MotionModelIdc[ x0 ][ y0 ] > 1 )
            mvd_coding(x0, y0, 1, 2 )
      }
      mvp_l1_flag[ x0 ][ y0 ]                                        ae(v)
   } else {
      MvdL1[ x0 ][ y0 ][ 0 ] = 0
      MvdL1[ x0 ][ y0 ][ 1 ] = 0
   }
   }
}
```

At last, it should be mentioned that given that the GPM mode consists of two uni-prediction partitions (except the blending samples on the split edge), some existing coding tools in the VVC and AVS3 that are specifically designed for bi-prediction, e.g., bi-directional optical flow, decoder-side motion vector refinement (DMVR) and bi-prediction with CU weights (BCW) can be automatically bypassed when the proposed GPM-EMS schemes are enabled for one inter CU. For instance, when one of the proposed GPM-EMS is enabled for one CU, the corresponding BCW weight need not to be further signaled for the CU to reduce signaling overhead given that the BCW cannot be applied to GPM mode.

The Combination of the GPM-MVR and GPM-EMS

In this section, a method is provided to combine the GPM-MVR and GPM-EMS for one CU with geometry partition. Specifically, different from either GPM-MVR or GPM-EMS where only one of merge-based motion signaling or explicit signaling can be applied to signal the uni-prediction MV of two GPM partitions, in the proposed scheme, it allows 1) one partition using GPM-MVR based motion signaling and the other using GPM-EMS based motion signaling; or 2) two partitions using GPM-MVR based motion signaling; or 3) two partitions using GPM-EMS based motion signaling. Using the GPM-MVR signaling in Table 4 and GPM-EMS in Table 10, Table 11 shows the corresponding syntax table after the proposed GPM-MVR and GPM-EMS are combined. In Table 11, newly added syntax elements are italic bold. As shown in Table 11, two additional syntax elements gpm_merge_flag0 and gpm_merge_flag1 are introduced respectively for partitions #1 and #2, which specify the corresponding partitions use GPM-MVR based merge signaling or GPM-EMS based explicit signaling. When the flag is one, it means that the GPM-MVR base signaling is enabled for the partition whose GPM uni-prediction motion will be signaled through merge_gpm_idxX, gpm_mvr_partIdxX_enabled flag, gpm_mvr_partIdxX_direction_idx and gpm_mvr_partIdxX_distance_idx, where X=0, 1. Otherwise, if the flag is zero, it means that the uni-prediction motion of the partition will be signaled explicitly by GPM-EMS manner using the syntax elements gpm_pred_dir_flagX, ref_idx_lX, mvp_lX_flag and mvd_lX, where X=0, 1.

TABLE 11

The proposed syntax table for GPM mode with the combination of GPM-MVR and GPM-EMS

| merge_data( x0, y0, cbWidth, cbHeight, chType ) { | Descriptor |
|---|---|
| ...... | |
| if( !ciip_flag[ x0 ][ y0 ] ) { | |
| gpm_partition_idx[ x0 ][ y0 ] | ae(v) |
| *gpm_merge_flag0[ x0 ][ y0 ]* | ae(v) |
| *if( gpm_merge_flag0[ x0 ][ y0 ] ) {* | |
| merge_gpm_idx0[ x0 ][ y0 ] | ae(v) |
| gpm_mvr_partIdx0_enable_flag[ x0 ][ y0 ] | ae(v) |
| if( gpm_mvr_partIdx0_enable_flag[ x0 ][ y0 ] ) { | |
| gpm_mvr_partIdx0_directoin_idx[ x0 ][ y0 ] | ae(v) |
| gpm_mvr_partIdx0_distance_idx[ x0 ][ y0 ] | ae(v) |
| } | |
| *}else{* | |
| *gpm_pred_dir_flag0[ x0 ][ y0 ]* | ae(v) |
| *ref_idx_l0[ x0 ][ y0 ]* | ae(v) |
| *mvd_coding(x0, y0, 0, 0 )* | |
| *mvp_l0_flag[ x0 ][ y0 ]* | ae(v) |
| *}* | |
| *gpm_merge_flag1[ x0 ][ y0 ]* | ae(v) |
| *if( gpm_merge_flag1[ x0 ][ y0 ] ) {* | |
| merge_gpm_idx1[ x0 ][ y0 ] | ae(v) |
| gpm_mvr_partIdx1_enable_flag[ x0 ][ y0 ] | ae(v) |
| if( gpm_mvr_partIdx1_enable_flag[ x0 ][ y0 ] ) { | |
| gpm_mvr_partIdx1_directoin_idx[ x0 ][ y0 ] | ae(v) |
| gpm_mvr_partIdx1_distance_idx[ x0 ][ y0 ] | ae(v) |
| } | |
| *}else{* | |
| *gpm_pred_dir_flag1[ x0 ][ y0 ]* | ae(v) |
| *ref_idx_l1[ x0 ][ y0 ]* | ae(v) |
| *mvd_coding( x0, y0, 0, 0 )* | |
| *mvp_l1_flag[ x0 ][ y0 ]* | ae(v) |
| *}* | |
| ...... | |
| } | |

The Combination of the GPM-MVR with the Template Matching

In this section, different solutions are provided to combine the GPM-MVR with the templating matching.

In method one, when one CU is coded in GPM mode, it is proposed to signal two separate flags for two GPM partitions, each indicating whether the uni-directional motion of the corresponding partition is further refined by template matching or not. When the flag is enabled, a template is generated using the left and top neighboring reconstructed samples of the current CU; then, the uni-directional motion of the partition will be refined by minimizing the difference between the template and its reference samples following the same procedure as introduced in the section "template matching." Otherwise (when the flag is disabled), the template matching is not applied to the partition, the GPM-MVR may be further applied. Using the GPM-MVR signaling method in Table 5 as an example, Table 12 illustrates the corresponding syntax table when the GPM-MVR is combined with template matching. In Table 12, newly added syntax elements are italic bold.

TABLE 12

The syntax elements of the proposed method of combining the GPM-MVR with template matching (Method One)

| merge_data( x0, y0, cbWidth, cbHeight, chType ) { | Descriptor |
|---|---|
| ...... | |
|     if( !ciip_flag[ x0 ][ y0 ] ) { | |
|         merge_gpm_partition_idx[ x0 ][ y0 ] | ae(v) |
|         *gpm_tm_enable_flag0[ x0 ][ y0 ]* | *ae(v)* |
|         *if( !gpm_tm_enable_flag0 ) {* | |
|             *gpm_mvr_partIdx0_enable_flag[ x0 ][ y0 ]* | *ae(v)* |
|         *}* | |
|         *if( gpm_mvr_partIdx0_enable_flag[ x0 ][ y0 ] ) {* | |
|             *gpm_mvr_partIdx0_directoin_idx[ x0 ][ y0 ]* | *ae(v)* |
|             *gpm_mvr_partIdx0_distance_idx[ x0 ][ y0 ]* | *ae(v)* |
|         *}* | |
|         *gpm_tm_enable_flag1[ x0 ][ y0 ]* | *ae(v)* |
|         *if( !gpm_tm_enable_flag1 ) {* | |
|             *gpm_mvr_partIdx1_enable_flag[ x0 ][ y0 ]* | *ae(v)* |
|         *}* | |
|         *if( gpm_mvr_partIdx1_enable_flag[ x0 ][ y0 ] ) {* | |
|             *gpm_mvr_partIdx1_direction_idx[ x0 ][ y0 ]* | *ae(v)* |
|             *gpm_mvr_partIdx1_distance_idx[ x0 ][ y0 ]* | *ae(v)* |
|         *}* | |
|     } | |
|     merge_gpm_idx0[ x0 ][ y0 ] | ae(v) |
|     merge_gpm_idx1[ x0 ][ y0 ] | ae(v) |
| ...... | |
| } | |

As show in Table 12, in the proposed scheme, two additional flags gpm_tm_enable_flag0 and gpm_tm_enable_flag1 are firstly signaled to indicate whether motion is refined for the two GPM partitions, respectively. When the flag is one, it indicates the TM is applied to refine the uni-directional MV of one partition. When the flag is zero, one flag (gpm_mvr_partIdx0_enable_flag or gpm_mvr_partIdx1_enable_flag) is further signaled to indicate whether the GPM-MVR is applied to the GPM partition, respectively. When the flag of one GPM partition is equal to one, the distance index (as indicated by the syntax elements gpm_mvr_partIdx0_distance_idx and gpm_mvr_partIdx1_distance_idx) and the direction index (as indicated by the syntax elements gpm_mvr_partIdx0_direction_idx and gpm_mvr_partIdx1_distance_idx) are signaled to specify the direction of the MVR. After that, the existing syntax merge_gpm_idx0 and merge_gpm_idx1 are signaled to identify the uni-directional MVs for two GPM partitions. Meanwhile, similar to the signaling conditions that are applied to Table 5, the following conditions may be applied to ensure that the resulting MVs used for the predictions of the two GPM partitions are not identical.

First, when both the values of gpm_tm_enable_flag0 and gpm_tm_enable_flag1 are equal to 1 (i.e., the TM is enabled for both two GPM partitions), the values of merge_gpm_idx0 and merge_gpm_idx1 cannot be the same.

Second, when one of gpm_tm_enable_flag0 and gpm_tm_enable_flag1 is one and the other is zero, the values of merge_gpm_idx0 and merge_gpm_idx1 are allowed to the same.

Otherwise, i.e., both gpm_tm_enable_flag0 and gpm_tm_enable_flag1 are equal to one: first, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same; second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical; third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical; fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, and gpm_mvr_partIdx1_direction_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above method one, the TM and MVR are applied to the GPM exclusively. In such scheme, it is prohibited to further apply the MVR on top of the refined MVs of the TM mode. Therefore, to further provide more MV candidates for the GPM, Method Two is proposed to enable the application of the MVR offset on top of the TM refined MVs. Table 13 illustrates the corresponding syntax table when the GPM-MVR is combined with template matching. In Table 13, newly added syntax elements are italic bold.

TABLE 13

The syntax elements of the provided method of combining the GPM-MVR with template matching (Method Two)

| merge_data( x0, y0, cbWidth, cbHeight, chType ) { | Descriptor |
|---|---|
| . . . . . . | |
|     if( !ciip_flag[ x0 ][ y0 ] ) { | |
|       merge_gpm_partition_idx[ x0 ][ y0 ] | ae(v) |
|       gpm_tm_enable_flag0[ x0 ][ y0 ] | ae(v) |
|       gpm_mvr_partIdx0_enable_flag[ x0 ][ y0 ] | ae(v) |
|       if( gpm_mvr_partIdx0_enable_flag[ x0 ][ y0 ] ) { | |
|         gpm_mvr_partIdx0_directoin_idx[ x0 ][ y0 ] | ae(v) |
|         gpm_mvr_partIdx0_distance_idx[ x0 ][ y0 ] | ae(v) |
|       } | |
|       gpm_tm_enable_flag1[ x0 ][ y0 ] | ae(v) |
|       gpm_mvr_partIdx1_enable_flag[ x0 ][ y0 ] | ae(v) |
|       if( gpm_mvr_partIdx1_enable_flag[ x0 ][ y0 ] ) { | |
|         gpm_mvr_partIdx1_direction_idx[ x0 ][ y0 ] | ae(v) |
|         gpm_mvr_partIdx1_distance_idx[ x0 ][ y0 ] | ae(v) |
|       } | |
|     } | |
|     merge_gpm_idx0[ x0 ][ y0 ] | ae(v) |
|     merge_gpm_idx1[ x0 ][ y0 ] | ae(v) |
| . . . . . . | |
| } | |

As shown in Table 13, different from Table 12, the signaling condition of gpm_mvr_partIdx0_enable_flag and gpm_mvr_partIdx1_enable_flag on gpm_tm_enable_flag0 and gpm_tm_enable_flag1 are removed. Such that, no matter whether the TM is applied to refine the uni-directional motion of one GPM partition or not, the MV refinements are always allowed to apply to the MV of the GPM partition. Similar as before, the following conditions should be applied to ensure the resulting MVs of two GPM partitions are not identical.

First, when one of gpm_tm_enable_flag0 and gpm_tm_enable_flag1 is one and the other is zero, the values of merge_gpm_idx0 and merge_gpm_idx1 are allowed to the same.

Otherwise, i.e., both gpm_tm_enable_flag0 and gpm_tm_enable_flag1 are equal to one, or both the flags are equal to zero: first, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same; second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical; third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical; fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, and gpm_mvr_partIdx1_direction_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above two methods, two separate flags need to be signaled to indicate whether the TM is applied to each GPM partition or not. The added signaling may reduce the overall coding efficiency due to the additional overhead, especially at low bit-rate. To reduce the signaling overhead, instead of introducing additional signaling, Method Three is proposed to insert the TM-based uni-directional MVs into the uni-directional MV candidate list of the GPM mode. The TM-based uni-directional MVs are generated following the same TM process as described in the section "template matching" and using the original uni-directional MV of the GPM as the initial MV. By such scheme, there is no need to further signal extra control flags from encoder to decoder. Instead, the decoder can identify whether one MV is refined by the TM or not through the corresponding merge indices (i.e., merge_gpm_idx0 and merge_gpm_idx1) received from the bitstream. There may be different methods to arrange the regular GPM MV candidates (i.e., non-TM) and the TM-based MV candidates. In one method, it is proposed to put the TM-based MV candidates at the beginning of the MV candidate list followed by the non-TM-based MV candidates. In another method, it is proposed to firstly put the non-TM-based MV candidates at the beginning followed by the TM-based candidates. In another method, it is proposed to put the TM-based MV candidates and non-TM-based MV candidates in an interleaved manner. For example, it can put the first N non-TM-based candidates; then all TM-based candidates; finally, the rest non-TM-based candidates. In another example, it can put the first N TM-based candidates; then, all non-TM-based candidates; finally, the rest TM-based candidates. In another example, it is proposed to put the non-TM-based candidates and the TM-based candidates one by the other, i.e., one non-TM-based candidate, one TM-based candidate, etc.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 9:
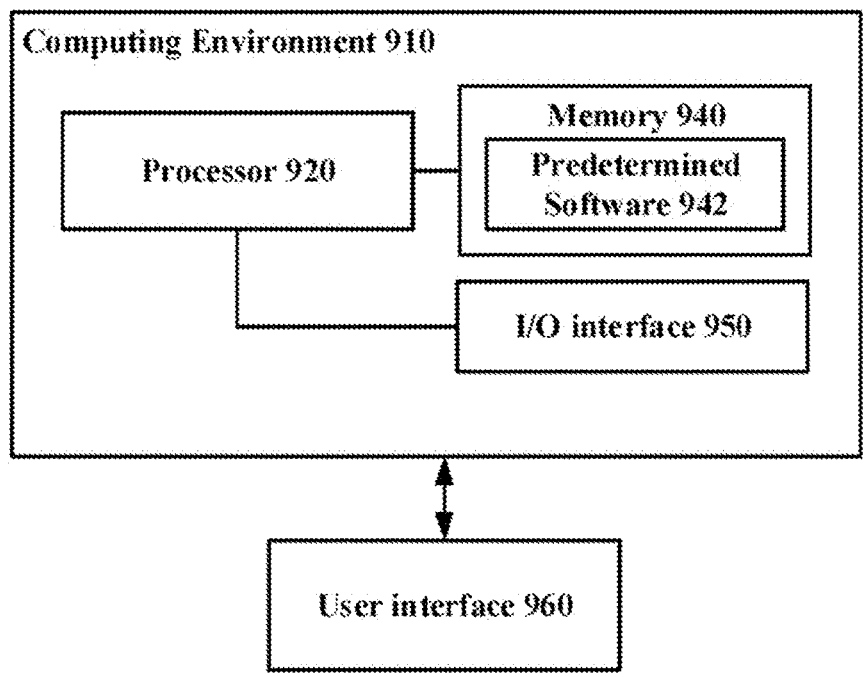
FIG. 9 is a diagram illustrating a computing environment coupled with a user interface according to an example of the present disclosure.

FIG. 9 shows a computing environment (or a computing device) 910 coupled with a user interface 960. The computing environment 910 can be part of a data processing server. In some embodiments, the computing device 910 can perform any of various methods or processes (such as encoding/decoding methods or processes) as described hereinbefore in accordance with various examples of the present disclosure. The computing environment 910 may include a processor 920, a memory 940, and an I/O interface 950.

The processor 920 typically controls overall operations of the computing environment 910, such as the operations associated with the display, data acquisition, data communications, and image processing. The processor 920 may include one or more processors to execute instructions to perform all or some of the steps in the above-described methods. Moreover, the processor 920 may include one or more modules that facilitate the interaction between the processor 920 and other components. The processor may be a Central Processing Unit (CPU), a microprocessor, a single chip machine, a GPU, or the like.

The memory 940 is configured to store various types of data to support the operation of the computing environment 910. Memory 940 may include predetermine software 942. Examples of such data include instructions for any applications or methods operated on the computing environment 910, video datasets, image data, etc. The memory 940 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 950 provides an interface between the processor 920 and peripheral interface modules, such as a keyboard, a click wheel, buttons, and the like. The buttons may include but are not limited to, a home button, a start scan button, and a stop scan button. The I/O interface 950 can be coupled with an encoder and decoder.

In some embodiments, there is also provided a non-transitory computer-readable storage medium including a plurality of programs, such as included in the memory 940, executable by the processor 920 in the computing environment 910, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 910 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Figure 8:
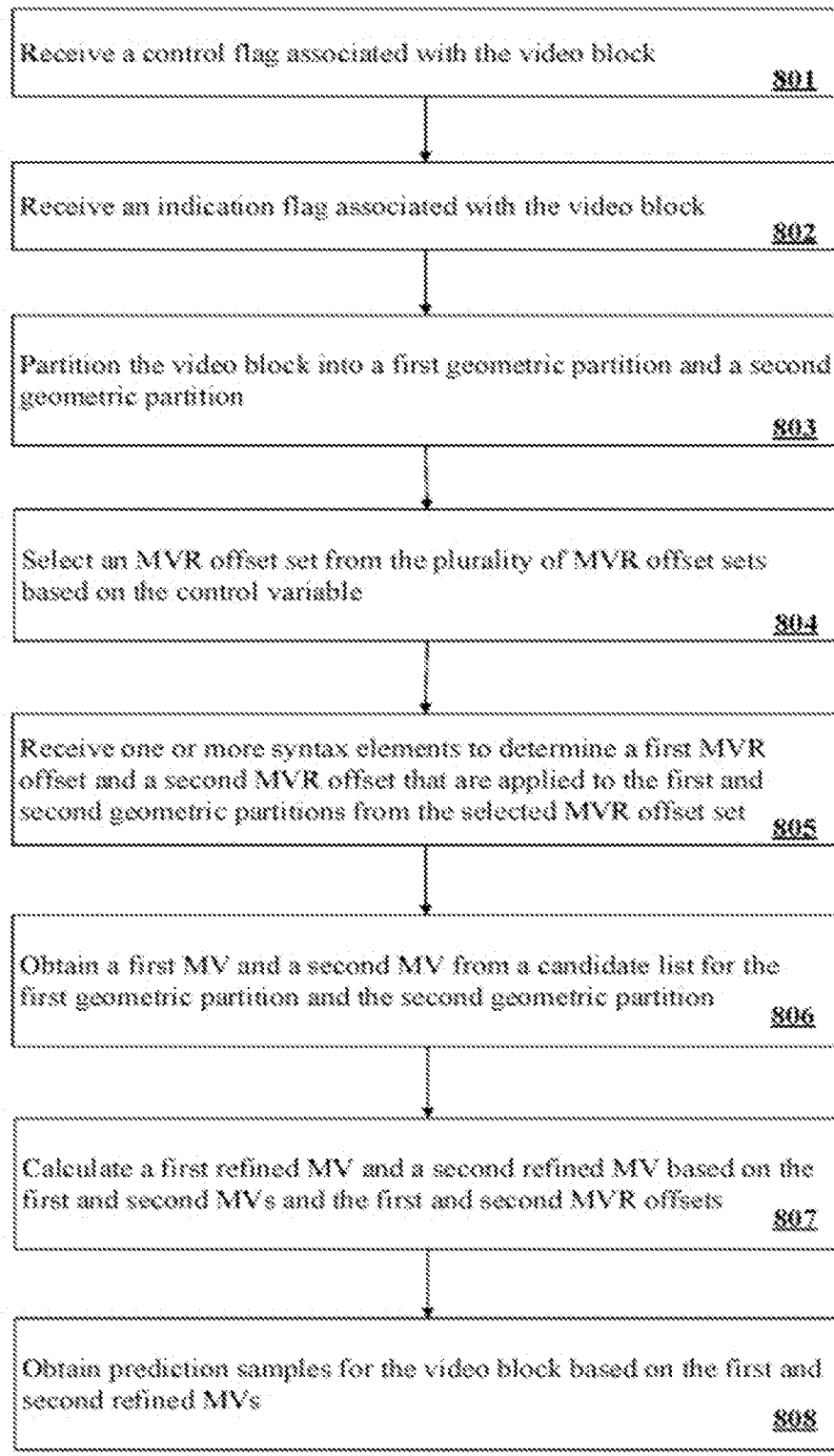
FIG. 8 is a method of decoding a video block in GPM according to an example of the present disclosure.

FIG. 8 is a flowchart illustrating a method for decoding a video block in GPM according to an example of the present disclosure.

In step 801, the processor 920 may receive a control flag associated with the video block. The control flag may be a control variable that includes one or more flags such as a binary flag, a non-binary flag, or any other variable. In one or more examples, the control variable may be the flag "ph_gpm_mvr_offset_set_flag" as shown in Table 17 or 21.

In some examples, the control variable enables adaptive switch between a plurality of MVR offset sets and the control variable is applied at a coding level.

In some examples, the coding level may be a sequence level, a picture/slice level, a CTU level or a coding block level. For example, when the control variable is signaled at the encoder side at the picture level, the decoder side correspondingly receives the control variable to indicate which MVR offset set to select for purpose of selecting the corresponding MVR offset associate with the current video block at the picture level.

In step 802, the processor 920 may receive an indication flag associated with the video block. The indication flag may be an indication variable that includes one or more flags such as a binary flag, a non-binary flag, or any other variable. In one or more examples, the indication variable may be the flag "ph_gpm_mvr_step_codeword_flag" as shown in Table 21. The value of the flag "ph_gpm_mvr_step_codeword_flag" swithches binarization tables so as to binarize different offset set with different codeword tables, thus obtaining more flexibility.

In some examples, the indication variable enables adaptive switch between a plurality of codeword tables that binarize a plurality of offset magnitudes in the plurality of MVR offset sets under the coding level.

In step 803, the processor 920 may partition the video block into a first geometric partition and a second geometric partition.

In step 804, the processor 920 may select an MVR offset set from the plurality of MVR offset sets based on the control variable.

In step 805, the processor 920 may receive one or more syntax elements to determine a first MVR offset and a second MVR offset that are applied to the first and second geometric partitions from the selected MVR offset set. The selected MVR offset set may be one MVR offset set selected by the control variable.

In some examples, the plurality of MVR offset sets may include a first MVR offset set and a second MVR offset set. In some examples, the first MVR offset set may include a plurality of default MVR offsets including a plurality of default offset magnitudes and a plurality of default MVR directions. In some examples, the second MVR offset set may include a plurality of alternative MVR offsets including a plurality of alternative offset magnitudes and a plurality of alternative offset directions. In some examples, the second MVR offset set may include more offset magnitudes than the first offset offset set and more offset directions than the first MVR offset set. For example, the plurality of default offset magnitudes and the plurality of default offset directions may include eight offset magnitudes (i.e., ¼-, ½-, 1, 2, 4, 8-, 16- and 32-pel) and four offset directions (i.e., ±x- and y-axis). The plurality of alternative offset magnitudes and the plurality of alternative offset directions may include the magnitudes and directions as shown in Tables 15-16 and Tables 19-20.

As shown in Tables 15-16 and Tables 19-20, the alternative MVR offset set may include more offset magnitudes in addition to the plurality of default offset magnitudes, and the alternative MVR offset set may include more offset directions in addition to the plurality of default offset directions.

In some examples, the processor 920 may determine that the first MVR offset set is applied in response to determining that the control variable is equal to 0 and may determining that the second MVR offset set is applied in response to determining that the control variable is equal to 1.

In some examples, the plurality of codeword tables includes a first codeword table and a second codeword table, and the first codeword table is used to binarize offset magnitudes in the first MVR offset sets and the second codeword table is used to binarize offset magnitudes in the second MVR offset sets, as shown in Tables. 19-20.

As shown in Tables 19-20, a first default offset magnitude (i.e., ¼-pel) indicating a distance of ¼ pixel from the video block, a second default offset magnitude (i.e., ½-pel) indicating a distance of ½ pixel from the video block, a third default offset magnitude (i.e., 1-pel) indicating a distance of 1 pixel from the video block, a fourth default offset magnitude (i.e., 2-pel) indicating a distance of 2 pixels from the video block, a fifth default offset magnitude (i.e., 4-pel) indicating a distance of 4 pixels from the video block, a sixth default offset magnitude (i.e., 8-pel) indicating a distance of 8 pixels from the video block, a seventh default offset magnitude (i.e., 16-pel) indicating a distance of 16 pixels from the video block, and an eight default offset magnitude (i.e., 32-pel) indicating a distance of 32 pixels from the video block.

Furthermore, as shown in Tables 19-20, a first alternative offset magnitude (i.e., ¼-pel) indicating a distance of ¼ pixel from the video block, a second alternative offset magnitude indicating (i.e., ½-pel) a distance of ½ pixel from the video block, a third alternative offset magnitude (i.e., 1-pel) indicating a distance of 1 pixel from the video block, a fourth alternative offset magnitude (i.e., 2-pel) indicating a distance of 2 pixels from the video block, a fifth alternative offset magnitude (i.e., 3-pel) indicating a distance of 3 pixels from the video block, a sixth alternative offset magnitude (i.e., 4-pel) indicating a distance of 4 pixels from the video block, a seventh alternative offset magnitude (i.e., 6-pel) indicating a distance of 6 pixels from the video block, an eight alternative offset magnitude (i.e., 8-pel) indicating a distance of 8 pixels from the video block, and a ninth alternative offset magnitude (i.e., 16-pel) indicating a distance of 16 pixels from the video block.

In some examples, the processor 920 may further determine that the first MVR offset set is applied and the plurality of default offset magnitudes are binarized using the first codeword table in response to determining that the control variable is equal to 0 and the indication variable is equal to 0. As shown in Table 19, the first default offset magnitude is binarized as 1, the second default offset magnitude is binarized as 10, the third default offset magnitude is binarized as 110, the fourth default offset magnitude is binarized as 1110, the fifth default offset magnitude is binarized as 11110, the sixth default offset magnitude is binarized as 111110, the seventh default offset magnitude is binarized as 1111110, and the eighth default offset magnitude is binarized as 1111111.

In some examples, the processor 920 may further determine that the first MVR offset set is applied and the plurality of default offset magnitudes are binarized using the second codeword table in response to determining that the control variable is equal to 0 and the indication variable is equal to 1. As shown in Table 20, the first default offset magnitude is binarized as 111110, the second default offset magnitude is binarized as 1, the third default offset magnitude is binarized as 10, the fourth default offset magnitude is binarized as 110, the fifth default offset magnitude is binarized as 1110, the sixth default offset magnitude is binarized as 11110, the seventh default offset magnitude is binarized as 1111110, and the eighth default offset magnitude is binarized as 1111111.

In some examples, the processor 920 may further determine that the second MVR offset set is applied and the plurality of alternative offset magnitudes are binarized using the first codeword table in response to determining that the control variable is equal to 1 and the indication variable is equal to 0. As shown in Table 19, the first alternative offset magnitude is binarized as 1, the second alternative offset magnitude is binarized as 10, the third alternative offset magnitude is binarized as 110, the fourth alternative offset magnitude is binarized as 1110, the fifth alternative offset magnitude is binarized as 11110, the sixth alternative offset magnitude is binarized as 111110, the seventh alternative offset magnitude is binarized as 1111110, the eighth alternative offset magnitude is binarized as 11111110, and the ninth alternative offset magnitude is binarized as 11111111.

In some examples, the processor 920 may further determine that the second MVR offset set is applied and the plurality of alternative offset magnitudes are binarized using the second codeword table in response to determining that the control variable is equal to 1 and the indication variable is equal to 1. As shown in Table 20, the first alternative offset magnitude is binarized as 111110, the second alternative offset magnitude is binarized as 1, the third alternative offset magnitude is binarized as 10, the fourth alternative offset magnitude is binarized as 110, the fifth alternative offset magnitude is binarized as 1110, the sixth alternative offset magnitude is binarized as 11110, the seventh alternative offset magnitude is binarized as 1111110, the eighth alternative offset magnitude is binarized as 11111110, and the ninth alternative offset magnitude is binarized as 11111111.

In some examples, the processor may further respectively binarize offset directions in the first and second MVR offset sets using fixed-length codeword.

In some examples, the processor 920 may further receive a first geometric partition enable syntax element (e.g., gpm_mvr_partIdx0_enable_flag) that indicates whether the MVR is applied to the first geometric partition or not; in response to determining that the geometric partition enable syntax element is equal to 1, receiving a first direction syntax element (e.g., gpm_mvr_partIdx0_direction_idx) and a first magnitude syntax element (e.g., gpm_mvr_partIdx0_distance_idx) that indicate offset direction and offset magnitude of the first MVR offset of the first geometric partition that are determined based on the selected MVR offset set; receiving a second geometric partition enable syntax element (e.g., gpm_mvr_partIdx1_enable_flag) that indicates whether the MVR is applied to the second geometric partition or not; and in response to determining that the second geometric partition enable syntax element is equal to 1, receiving a second direction syntax element (e.g., gpm_mvr_partIdx1_direction_idx) and a second magnitude syntax element (e.g., gpm_mvr_partIdx1_distance_idx) that indicate offset direction and offset magnitude of the second MVR offset of the second geometric partition that are determined based on the selected MVR offset set.

In step 806, the processor 920 may obtain a first MV and a second MV from a candidate list for the first geometric partition and the second geometric partition.

In step 807, the processor 920 may calculate a first refined MV and a second refined MV based on the first and second MVs and the first and second MVR offsets.

In step 808, the processor 920 may obtain prediction samples for the video block based on the first and second refined MVs.

In some examples, there is provided an apparatus for decoding a video block in GPM. The apparatus includes a processor 920 and a memory 940 configured to store instructions executable by the processor; where the processor, upon execution of the instructions, is configured to perform a method as illustrated in FIG. 8.

In some other examples, there is provided a non-transitory computer readable storage medium, having instructions stored therein. When the instructions are executed by a processor 920, the instructions cause the processor to perform a method as illustrated in FIG. 8.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method of decoding a video block in geometry partition mode (GPM), comprising:
   receiving a control variable associated with the video block, wherein the control variable enables adaptive switch between a plurality of motion vector refinement (MVR) offset sets and the control variable is applied at a coding level;
   receiving an indication variable associated with the video block, wherein the indication variable enables adaptive switch between a plurality of codeword tables that binarize a plurality of offset magnitudes in the plurality of MVR offset sets under the coding level;
   partitioning the video block into a first geometric partition and a second geometric partition;
   selecting an MVR offset set from the plurality of MVR offset sets based on the control variable;
   receiving one or more syntax elements to determine a first MVR offset and a second MVR offset that are applied to the first geometric partition and the second geometric partition from a selected MVR offset set;
   obtaining a first motion vector (MV) and a second MV from a candidate list for the first geometric partition and the second geometric partition;
   calculating a first refined MV and a second refined MV based on the first MV, the second MV, the first MVR offset, and the second MVR offset; and
   obtaining prediction samples for the video block based on the first refined MV and the second refined MV;
   wherein the plurality of MVR offset sets comprise a first MVR offset set and a second MVR offset set, and the second MVR offset set comprises at least one offset magnitude of the first MVR offset set.

2. The method of claim 1, wherein the coding level comprises a sequence level, a picture level, a coding tree unit level, or a coding block level.

3. The method of claim 1,
   wherein the plurality of codeword tables comprises a first codeword table and a second codeword table.

4. The method of claim 3, further comprising:
   in response to determining that the control variable is equal to 0, determining that the first MVR offset set is applied; and
   in response to determining that the control variable is equal to 1, determining that the second MVR offset set is applied.

5. The method of claim 4, further comprising:
   in response to determining that the indication variable is equal to 0, determining that the first codeword table is applied; and
   in response to determining that the indication variable is equal to 1, determining that the second codeword table is applied.

6. The method of claim 5, wherein the first MVR offset set comprises a plurality of default offset magnitudes comprising:
   a first default offset magnitude indicating a distance of ¼ pixel from the video block,
   a second default offset magnitude indicating a distance of ½ pixel from the video block,
   a third default offset magnitude indicating a distance of 1 pixel from the video block,
   a fourth default offset magnitude indicating a distance of 2 pixels from the video block,
   a fifth default offset magnitude indicating a distance of 4 pixels from the video block,
   a sixth default offset magnitude indicating a distance of 8 pixels from the video block,
   a seventh default offset magnitude indicating a distance of 16 pixels from the video block, and
   an eighth default offset magnitude indicating a distance of 32 pixels from the video block; and
   wherein the second MVR offset set comprises a plurality of alternative offset magnitudes comprising:
   a first alternative offset magnitude indicating a distance of ¼ pixel from the video block,
   a second alternative offset magnitude indicating a distance of ½ pixel from the video block,
   a third alternative offset magnitude indicating a distance of 1 pixel from the video block,
   a fourth alternative offset magnitude indicating a distance of 2 pixels from the video block,
   a fifth alternative offset magnitude indicating a distance of 3 pixels from the video block,
   a sixth alternative offset magnitude indicating a distance of 4 pixels from the video block,
   a seventh alternative offset magnitude indicating a distance of 6 pixels from the video block,
   an eighth alternative offset magnitude indicating a distance of 8 pixels from the video block, and
   a ninth alternative offset magnitude indicating a distance of 16 pixels from the video block.

7. The method of claim 6, further comprising:
   in response to determining that the control variable is equal to 0 and the indication variable is equal to 0, determining that the first MVR offset set is applied and determining that the plurality of default offset magnitudes are binarized using the first codeword table, wherein determining that the plurality of default offset magnitudes are binarized using the first codeword table comprises determining:
the first default offset magnitude is binarized as 1,
the second default offset magnitude is binarized as 10,
the third default offset magnitude is binarized as 110,
the fourth default offset magnitude is binarized as 1110,
the fifth default offset magnitude is binarized as 11110,
the sixth default offset magnitude is binarized as 111110,
the seventh default offset magnitude is binarized as 1111110, and
the eighth default offset magnitude is binarized as 1111111.

8. The method of claim 6, further comprising:
in response to determining that the control variable is equal to 0 and the indication variable is equal to 1, determining that the first MVR offset set is applied and determining that the plurality of default offset magnitudes are binarized using the second codeword table,
wherein determining that the plurality of default offset magnitudes are binarized using the second codeword table comprises determining:
the first default offset magnitude is binarized as 111110,
the second default offset magnitude is binarized as 1,
the third default offset magnitude is binarized as 10,
the fourth default offset magnitude is binarized as 110,
the fifth default offset magnitude is binarized as 1110,
the sixth default offset magnitude is binarized as 11110,
the seventh default offset magnitude is binarized as 1111110, and
the eighth default offset magnitude is binarized as 11111111.

9. The method of claim 6, further comprising:
in response to determining that the control variable is equal to 1 and the indication variable is equal to 0, determining that the second MVR offset set is applied and determining that the plurality of alternative offset magnitudes are binarized using the first codeword table,
wherein determining that the plurality of alternative offset magnitudes are binarized using the first codeword table comprises determining:
the first alternative offset magnitude is binarized as 1,
the second alternative offset magnitude is binarized as 10,
the third alternative offset magnitude is binarized as 110,
the fourth alternative offset magnitude is binarized as 1110,
the fifth alternative offset magnitude is binarized as 11110,
the sixth alternative offset magnitude is binarized as 111110,
the seventh alternative offset magnitude is binarized as 1111110,
the eighth alternative offset magnitude is binarized as 11111110, and
the ninth alternative offset magnitude is binarized as 11111111.

10. The method of claim 6, further comprising:
in response to determining that the control variable is equal to 1 and the indication variable is equal to 1, determining that the second MVR offset set is applied and determining that the plurality of alternative offset magnitudes are binarized using the second codeword table,
wherein determining that the plurality of alternative offset magnitudes are binarized using the second codeword table comprises determining:
the first alternative offset magnitude is binarized as 111110,
the second alternative offset magnitude is binarized as 1,
the third alternative offset magnitude is binarized as 10,
the fourth alternative offset magnitude is binarized as 110,
the fifth alternative offset magnitude is binarized as 1110,
the sixth alternative offset magnitude is binarized as 11110,
the seventh alternative offset magnitude is binarized as 1111110,
the eighth alternative offset magnitude is binarized as 11111110, and
the ninth alternative offset magnitude is binarized as 11111111.

11. The method of claim 1, wherein the plurality of MVR offset sets comprise a first MVR offset set and a second MVR offset set,
wherein the second MVR offset set comprises at least one offset direction of the first MVR offset set, and
wherein offset directions in the first MVR offset set and the second MVR offset set are respectively binarized using fixed-length codeword.

12. The method of claim 1, wherein receiving the one or more syntax elements to determine the first MVR offset and the second MVR offset that are applied to the first geometric partition and the second geometric partition from the selected MVR offset set comprises:
receiving a first geometric partition enable syntax element that indicates whether an MVR is applied to the first geometric partition or not;
in response to determining that the first geometric partition enable syntax element is equal to 1, receiving a first direction syntax element and a first magnitude syntax element that indicate offset direction and offset magnitude of the first MVR offset of the first geometric partition that are determined based on the selected MVR offset set;
receiving a second geometric partition enable syntax element that indicates whether the MVR is applied to the second geometric partition or not; and
in response to determining that the second geometric partition enable syntax element is equal to 1, receiving a second direction syntax element and a second magnitude syntax element that indicate offset direction and offset magnitude of the second MVR offset of the second geometric partition that are determined based on the selected MVR offset set.

13. The method of claim 12, wherein the first geometric partition enable syntax element comprises gpm_mvr_partIdx0_enable_flag;
wherein the first direction syntax element and the first magnitude syntax element comprise gpm_mvr_partIdx0_direction_idx and gpm_mvr_partIdx0_distance_idx respectively;
wherein the second geometric partition enable syntax element comprises gpm_mvr_partIdx1_enable_flag; and
wherein the second direction syntax element and the second magnitude syntax element comprise gpm_mvr_partIdx1_direction_idx and gpm_mvr_partIdx1_distance_idx respectively.

14. An apparatus for video decoding, comprising:
one or more processors; and
a memory configured to store instructions executable by the one or more processors, wherein the one or more processors, upon execution of the instructions, are configured to perform a method of decoding a video block in geometry partition mode (GPM), comprising:

receiving a control variable associated with the video block, wherein the control variable enables adaptive switch between a plurality of motion vector refinement (MVR) offset sets and the control variable is applied at a coding level;

receiving an indication variable associated with the video block, wherein the indication variable enables adaptive switch between a plurality of codeword tables that binarize a plurality of offset magnitudes in the plurality of MVR offset sets under the coding level;

partitioning the video block into a first geometric partition and a second geometric partition;

selecting an MVR offset set from the plurality of MVR offset sets based on the control variable;

receiving one or more syntax elements to determine a first MVR offset and a second MVR offset that are applied to the first geometric partition and the second geometric partition from a selected MVR offset set;

obtaining a first motion vector (MV) and a second MV from a candidate list for the first geometric partition and the second geometric partition;

calculating a first refined MV and a second refined MV based on the first MV, the second MV, the first MVR offset, and the second MVR offset; and obtaining prediction samples for the video block based on the first refined MV and the second refined MV;

wherein the plurality of MVR offset sets comprise a first MVR offset set and a second MVR offset set, and the second MVR offset set comprises at least one offset magnitude of the first MVR offset set.

15. A method of encoding a video block in geometry partition mode (GPM), comprising:

determining a control variable associated with the video block, wherein the control variable enables adaptive switch between a plurality of motion vector refinement (MVR) offset sets and the control variable is applied at a coding level;

determining an indication variable associated with the video block, wherein the indication variable enables adaptive switch between a plurality of codeword tables that binarize a plurality of offset magnitudes in the plurality of MVR offset sets under the coding level;

partitioning the video block into a first geometric partition and a second geometric partition;

selecting an MVR offset set from the plurality of MVR offset sets based on the control variable;

determining a first MVR offset and a second MVR offset that are applied to the first and second geometric partitions from the selected MVR offset set;

obtaining a first motion vector (MV) and a second MV from a candidate list for the first geometric partition and the second geometric partition;

calculating a first refined MV and a second refined MV based on the first and second MVs and the first and second MVR offsets; and obtaining prediction samples for the video block based on the first and second refined MVs;

wherein the plurality of MVR offset sets comprise a first MVR offset set and a second MVR offset set, and the second MVR offset set comprises at least one offset magnitude of the first MVR offset set.

16. An apparatus for video encoding, comprising:

one or more processors; and a memory configured to store instructions executable by the one or more processors, wherein the one or more processors, upon execution of the instructions, are configured to perform the method of claim 15.

17. A method of storing a bitstream, comprising:

performing the method of claim 15 to generate a bitstream; and storing the bitstream on a non-transitory computer-readable storage medium.

* * * * *